(12) United States Patent
Miller et al.

(10) Patent No.: US 9,783,144 B2
(45) Date of Patent: Oct. 10, 2017

(54) TRAILER WITH REAR IMPACT GUARD

(71) Applicant: STI Holdings, Inc., Stoughton, WI (US)

(72) Inventors: Daniel Patrick Miller, Madison, WI (US); Gary Lynn Fenton, Edgerton, WI (US)

(73) Assignee: STI Holdings, Inc., Stoughton, WI (US)

( * ) Notice: Subject to any disclaimer, the term of this patent is extended or adjusted under 35 U.S.C. 154(b) by 0 days.

(21) Appl. No.: 15/240,256

(22) Filed: Aug. 18, 2016

(65) Prior Publication Data
US 2017/0050596 A1    Feb. 23, 2017

Related U.S. Application Data

(60) Provisional application No. 62/311,695, filed on Mar. 22, 2016, provisional application No. 62/206,653, (Continued)

(51) Int. Cl.
| B60R 19/24 | (2006.01) |
| B60R 19/56 | (2006.01) |
| B62D 25/08 | (2006.01) |
| B62D 33/04 | (2006.01) |
| B62D 53/06 | (2006.01) |

(52) U.S. Cl.
CPC ............. B60R 19/24 (2013.01); B60R 19/56 (2013.01); B62D 25/08 (2013.01); B62D 33/04 (2013.01); B62D 53/06 (2013.01)

(58) Field of Classification Search
CPC ... B60R 19/24; B60R 19/56; B60R 2019/242; B60R 2019/247; B62D 25/08; B62D 33/04; B62D 53/06
See application file for complete search history.

(56) References Cited

U.S. PATENT DOCUMENTS

| 3,578,358 A | 5/1971 | Reynolds |
| 3,698,609 A | 10/1972 | Lund |

(Continued)

OTHER PUBLICATIONS

"The Future of Trucking; Who pays for the costs of safer roads?" AnnaLeah & Mary, Truck Saftey, Jun. 5, 2015 (4 pages).

(Continued)

*Primary Examiner* — Gregory Blankenship
(74) *Attorney, Agent, or Firm* — Michael Best & Friedrich LLP

(57) ABSTRACT

A trailer includes front and rear ends and a cargo area. A rear bolster extends transversely to a longitudinal direction at a bottom rear edge of the cargo area. A rear impact guard includes a bumper having opposing distal ends spaced laterally across the trailer. A pair of distal end supports connect to the distal ends of the bumper, each including a diagonal truss member and a vertical stabilizer. The diagonal truss extends along an axis in a forward, inward and upward direction from the bumper. The vertical stabilizer members are separate from the diagonal truss members and extend upwardly from the bumper to the rear bolster. The vertical stabilizer reduces an offset component of buckling load on the diagonal truss member upon rear impact. At least one inboard post extends between the bumper and the rear bolster at a location between the pair of distal end supports.

26 Claims, 18 Drawing Sheets

Related U.S. Application Data filed on Aug. 18, 2015, provisional application No. 62/206,661, filed on Aug. 18, 2015.

(56) References Cited

U.S. PATENT DOCUMENTS

| | | | |
|---|---|---|---|
| 3,871,695 A | 3/1975 | Koenig | |
| 4,359,239 A | 11/1982 | Eggert, Jr. | |
| 4,514,002 A * | 4/1985 | McIntosh | B60R 19/56 293/118 |
| 5,507,546 A | 4/1996 | Holley | |
| 5,632,518 A | 5/1997 | Kendall | |
| 5,673,953 A | 10/1997 | Spease | |
| 6,520,469 B1 | 2/2003 | DiMauro | |
| 6,523,872 B2 | 2/2003 | Breed | |
| 7,086,674 B2 | 8/2006 | Goertz | |
| 7,407,204 B2 | 8/2008 | Eriksson et al. | |
| 7,967,349 B2 | 6/2011 | Puppini et al. | |
| 8,720,924 B2 | 5/2014 | Ruehl | |
| 9,566,923 B2 * | 2/2017 | Wylezinski | B60R 19/023 |
| 2004/0061357 A1 * | 4/2004 | Long | B62D 33/04 296/186.3 |
| 2008/0073921 A1 * | 3/2008 | Smidler | B60R 19/56 293/155 |
| 2008/0073941 A1 * | 3/2008 | Wylezinski | B60P 1/445 296/209 |
| 2009/0001768 A1 * | 1/2009 | Saitou | B60R 19/56 296/204 |
| 2009/0102209 A1 * | 4/2009 | Ryden | B60R 19/56 293/132 |
| 2017/0050595 A1 * | 2/2017 | Miller | B60R 19/24 |
| 2017/0050596 A1 * | 2/2017 | Miller | B60R 19/24 |

OTHER PUBLICATIONS

"Truck Drivers: Please make sure your underside (rear impact) guards are in good shape!" AnnaLeah and Mary, Truck Safety, Jun. 2, 2015 (6 pages).

"Underride Conversation with David Friedman, NHTSA Deputy Administrator," AnnaLeah and Mary, Truck Safety, May 15, 2015 (3 pages).

"Be a part of our team to promote safety & save lives," AnnaLeah and Mary, Truck Safety, Apr. 30, 2015 (3 pages).

"What Came After the AnnaLeah & Mary Stand Up for Truck Safety Petition?" AnnaLeah and Mary, Truck Safety, Mar. 8, 2015 (6 pages).

"Help Us Design the Best Possible Underride Guard," AnnaLeah and Mary, Truck Safety, Dec. 22, 2014 (5 pages).

"The Passion of This Safety Advocate," AnnaLeah and Mary, Truck Safety, Dec. 20, 2014 (2 pages).

"Underride Guards; Let's Move Forward in 2015," AnnaLeah and Mary, Truck Safety, Dec. 20, 2014 (2 pages).

Photo of trailer with underside guard, <http://www.awjlaw.com/images/shutterstock_35651434.jpg> publicly available as early as Jun. 23, 2015 (1 page).

"IIHS Reports on New Crash Testing for Improved Underride Guards," AnnaLeah and Mary, Truck Safety, Oct. 9, 2014 (2 pages).

Boites de camions Dynamic, "Truck Boxes Dynamic 4 types of construction of its refrigerated boxes," 2013 (3 pages).

"Fox 5 Investigates: Deadly danger on the roads," Sep. 12, 2012 (2 pages).

Insurance Institute for Highway Safety, "On guard: Safety gear on the back of truck trailers is improving," Status Report, vol. 49, No. 7, Oct. 9, 2014 (3 pages).

"Crash Test #2 First Guard Designed by the Impact Project Team (Articulated Guard)," SAE Technical Paper 973106, (2 pages).

"Crash Test #3 The Pliers Underride Guard," SAE Technical Paper 982879 (2 pages).

"Crash Test #4 Underride Guard with energy absorption capability," (2 pages).

Insurance Institute for Highway Safety, "Not good enough: Underride guards on big rigs can be lifesavers, but most leave passenger vehicle occupants at risk in certain crashes," Status Report, vol. 48, No. 2, Mar. 14, 2013 (6 pages).

Auto Safety Expert "Truck Underride Hazards," <www.autosafetyexpert.com/video.php?movieToPlay=truckunderqt.mov, publicly available as early as Jun. 23, 2015 (2 pages).

* cited by examiner

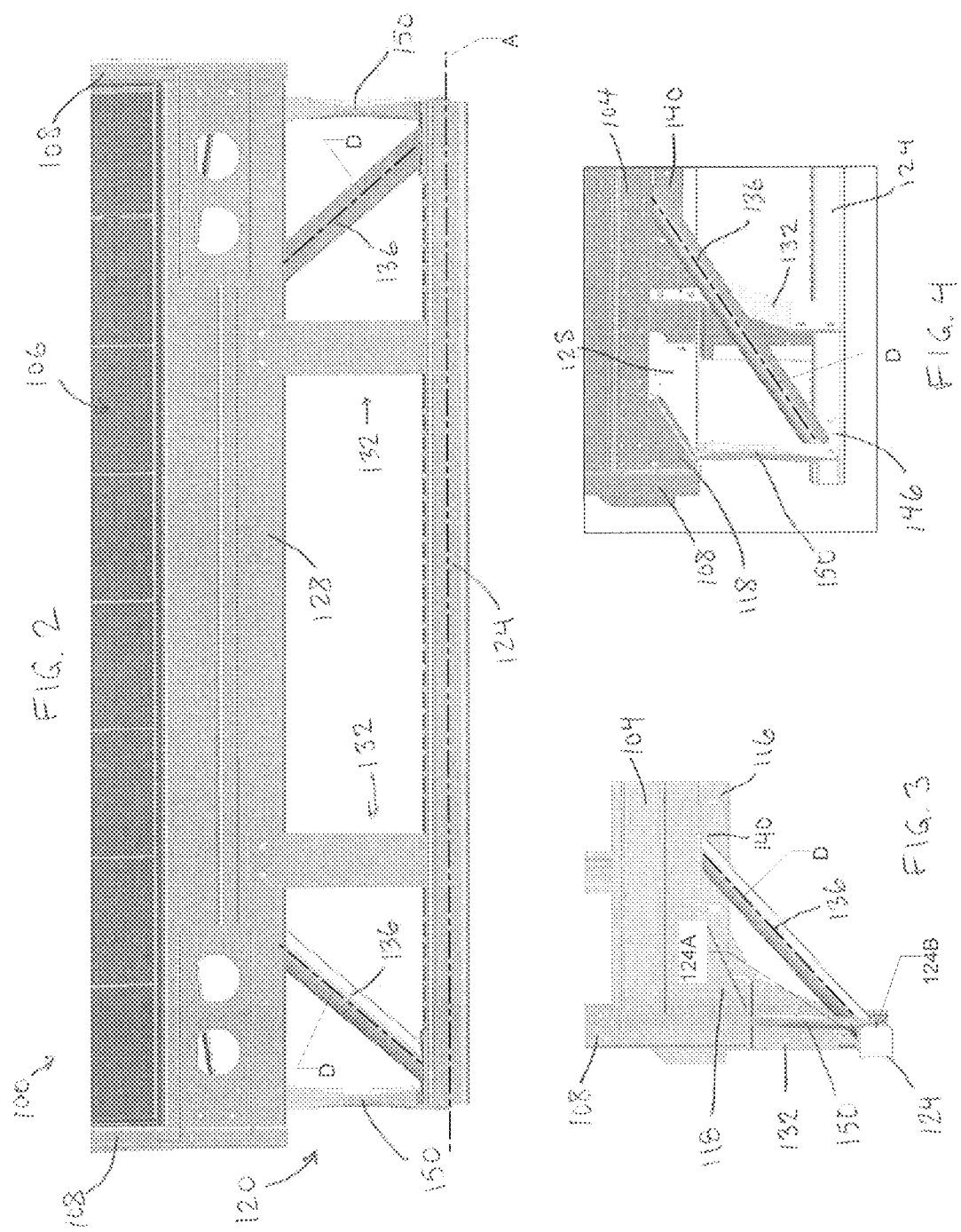

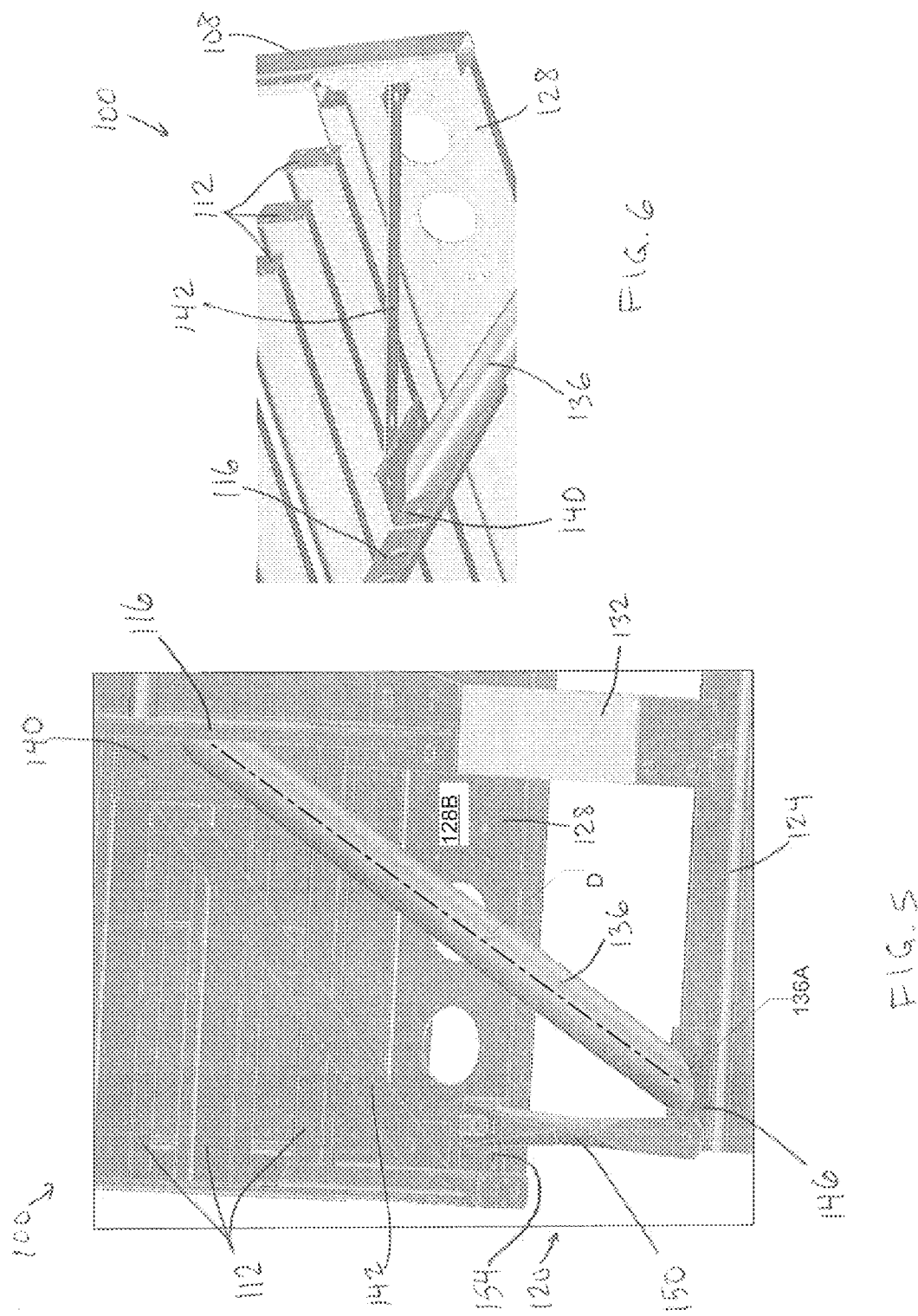

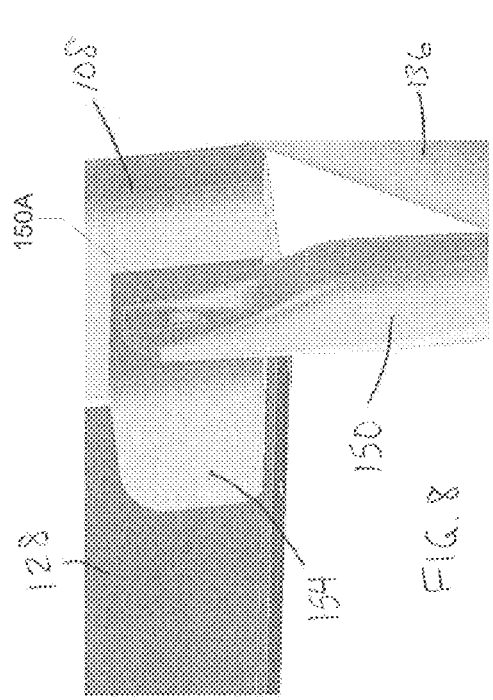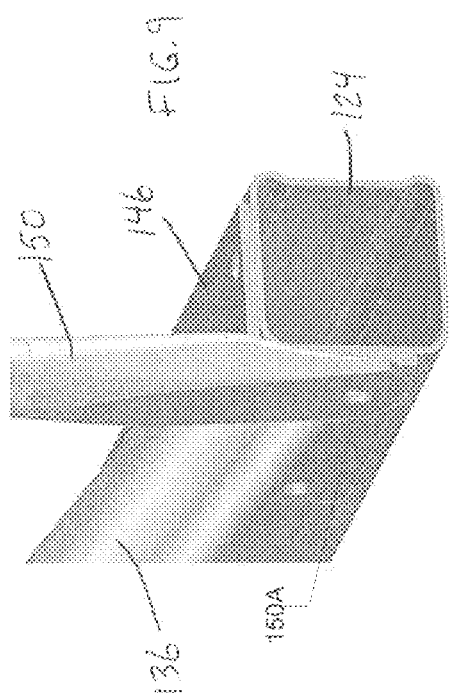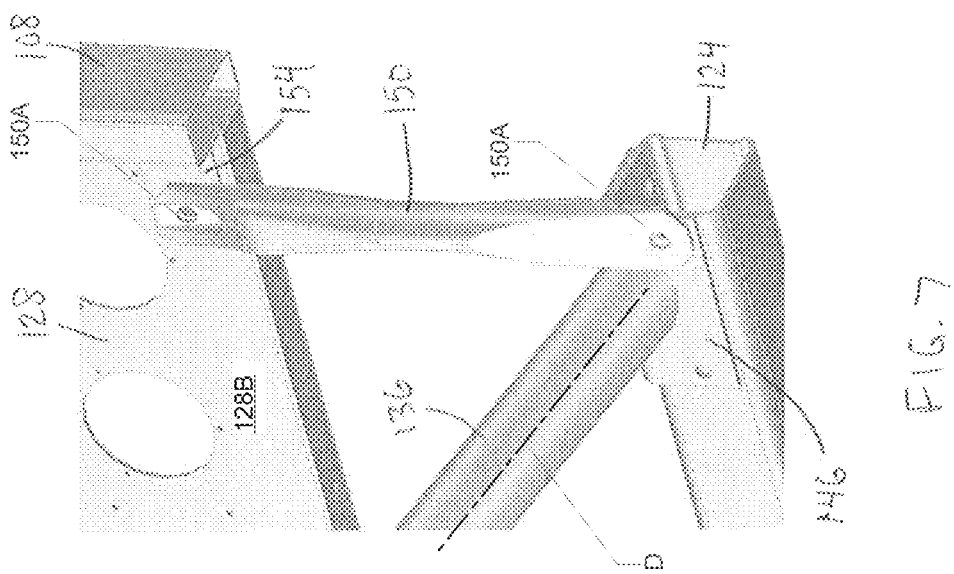

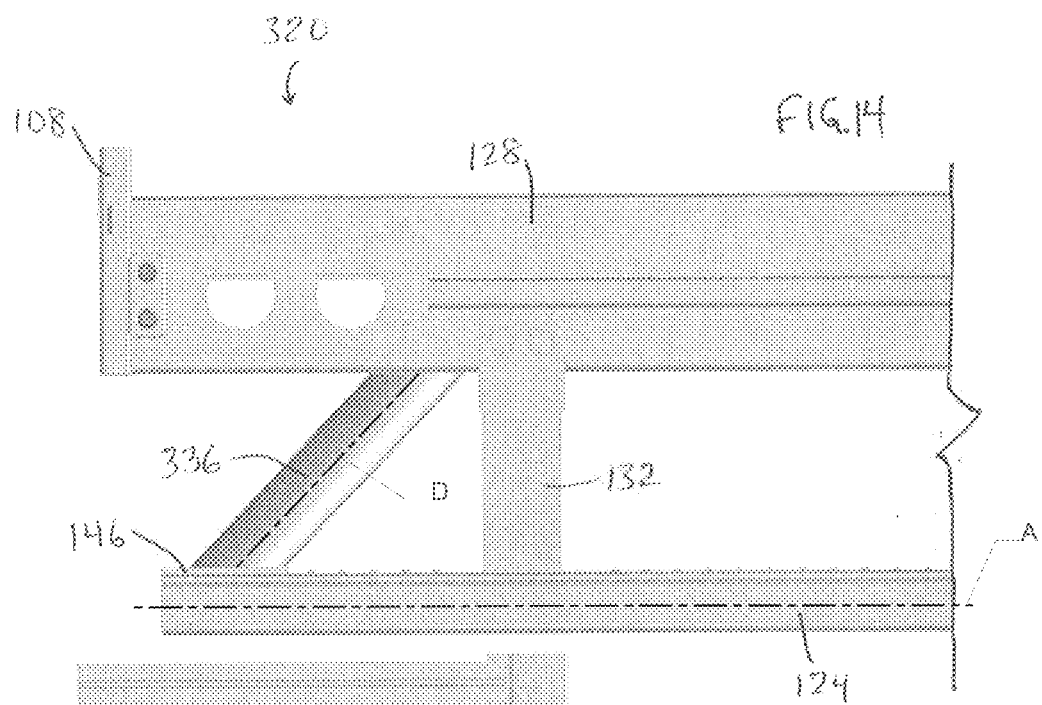
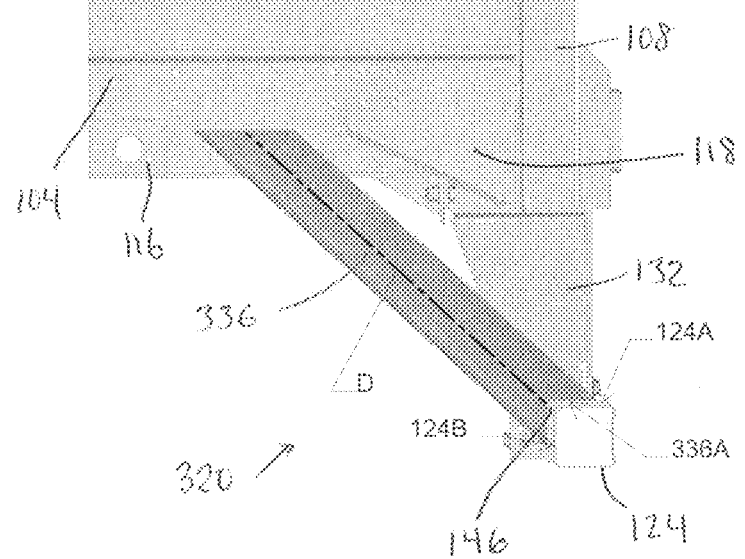

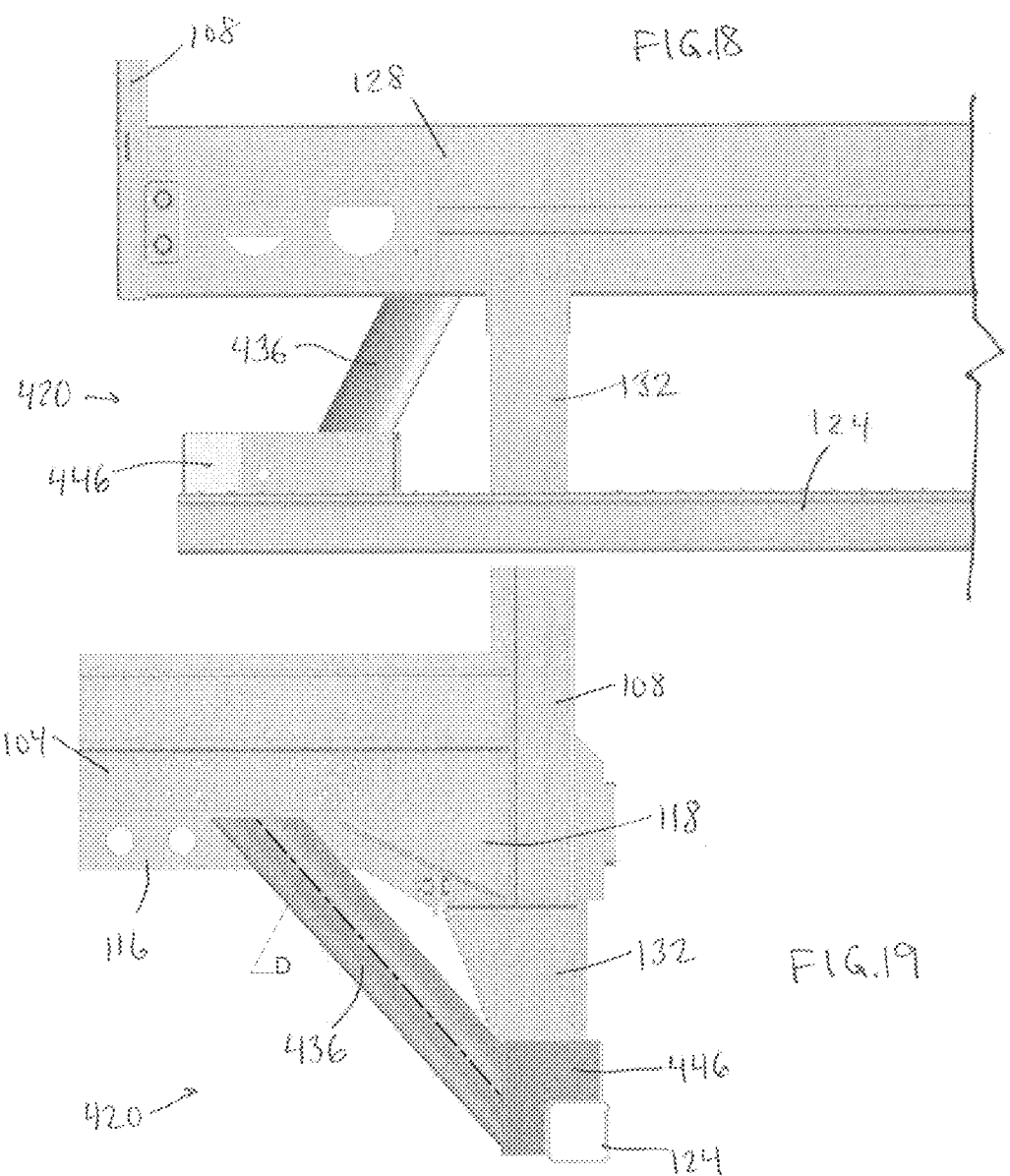

TRAILER WITH REAR IMPACT GUARD

CROSS-REFERENCE TO RELATED APPLICATIONS

This application claims priority to U.S. Provisional Patent Application No. 62/206,661, filed Aug. 18, 2015 and to U.S. Provisional Patent Application No. 62/206,653 filed Aug. 18, 2015 and to U.S. Provisional Patent Application No. 62/311,695, filed Mar. 22, 2016, the entire contents of all of which are incorporated by reference herein.

BACKGROUND

The invention relates to over-the-road trailers and rear impact guards thereof. A conventional trailer 1000 is shown in FIG. 1, and is configured for over-the-road use with a truck to transport large cargo volumes. The trailer 1000 has a defined front end 1020 adapted for attachment with the truck, and a defined rear end 1040 opposite the front end 1020. A front-rear, longitudinal, or lengthwise direction X is defined between the front and rear ends 1020, 1040. A transverse or lateral direction Y is defined perpendicular to the lengthwise direction X. The lengthwise and lateral directions Y are both parallel to a ground surface along which the trailer 1000 is conveyable. The rear end 1040 in many cases is provided with doors for accessing the cargo area defined between the front and rear ends 1020, 1040 (and between the sidewalls 1050 and roof 1060, if so equipped). At the rear end 1040 of the trailer, a rear impact guard 1100 is provided. The rear impact guard 1100 complies with federal mandates for many common types of trailers and is designed to reduce the severity of a crash when a vehicle following the trailer 1000 impacts the rear end 1040 of the trailer 1000. The rear impact guard 1100 provides a lowered bumper 1110 below the rear sill or rear bolster 1130 at the bottom rear end of the cargo area. However, it may be desirable to further improve safety, especially for off-center impacts, while minimizing cost and weight penalties to the trailer.

SUMMARY

In one aspect, the invention provides a trailer including a front end provided for attachment to a truck and a rear end spaced from the front end in a longitudinal direction to define a cargo area between the front and rear ends. A frame includes a rear bolster extending transversely to the longitudinal direction at a bottom rear edge of the cargo area, and the trailer further includes a rear impact guard with a bumper positioned at the rear end of the trailer and spaced below the rear bolster. The bumper has opposing distal ends spaced laterally across the trailer. A pair of distal end supports are connected to the corresponding distal ends of the bumper, each of the pair of distal end supports including a diagonal truss member coupled to the distal end of the bumper and extending therefrom along an axis in a forward, inward and upward direction from the bumper to an attachment point beneath the cargo area, and each of the distal end supports including a vertical stabilizer member separate from the diagonal truss member and coupled to the distal end of the bumper and extending upwardly to the rear bolster. The vertical stabilizer reduces an offset component of buckling load incident on the diagonal truss member upon rear impact to the bumper. At least one inboard post extends between the bumper and the rear bolster at a location between the pair of distal end supports.

In another aspect, the invention provides a trailer including a front end provided for attachment to a truck and a rear end spaced from the front end in a longitudinal direction to define a cargo area between the front and rear ends. A frame includes a rear bolster extending transversely to the longitudinal direction at a bottom rear edge of the cargo area, and the trailer further includes a rear impact guard with a bumper positioned at the rear end of the trailer and spaced below the rear bolster. The bumper has opposing distal ends spaced laterally across the trailer. A pair of distal end supports are connected to the corresponding distal ends of the bumper, each of the pair of distal end supports including a diagonal truss member coupled to the distal end of the bumper and extending therefrom along an axis in a forward, inward and upward direction from the bumper to an attachment point beneath the cargo area. Each of the diagonal truss members has a rear end defining a notch that conforms to and receives both a top side of the bumper and a forward side of the bumper. At least one inboard post extends between the bumper and the rear bolster at a location between the pair of distal end supports.

BRIEF DESCRIPTION OF THE DRAWINGS

FIG. 2 is a rear view of a portion of a trailer having a rear impact guard according to one embodiment of the present invention.

FIG. 3 is side view of the portion of the trailer including the rear impact guard of FIG. 2.

FIG. 4 is a perspective view of the portion of the trailer including the rear impact guard of FIG. 2, looking in a rearward direction.

FIG. 5 is another perspective view of the rear impact guard of FIG. 2, looking upward toward an underside of the trailer, illustrating a diagonal tension strap.

FIG. 6 is a perspective view of a portion of the trailer frame of FIGS. 2-5, shown with a cargo floor and a vertical stabilizer removed.

FIG. 7 is a perspective view of one distal end of the rear impact guard of FIG. 2.

FIG. 8 is a detail perspective view of an upper end of the vertical stabilizer.

FIG. 9 is a detail perspective view of a lower end of the vertical stabilizer.

FIG. 14 is a rear view of a portion of a trailer including a rear impact guard according to another embodiment of the present invention.

FIG. 15 is a side view of the rear impact guard of FIG. 14.

FIG. 18 is a rear view of a portion of a trailer including a rear impact guard according to another embodiment of the present invention.

FIG. 19 is a side view of the rear impact guard of FIG. 18.

DETAILED DESCRIPTION

Figure 1:
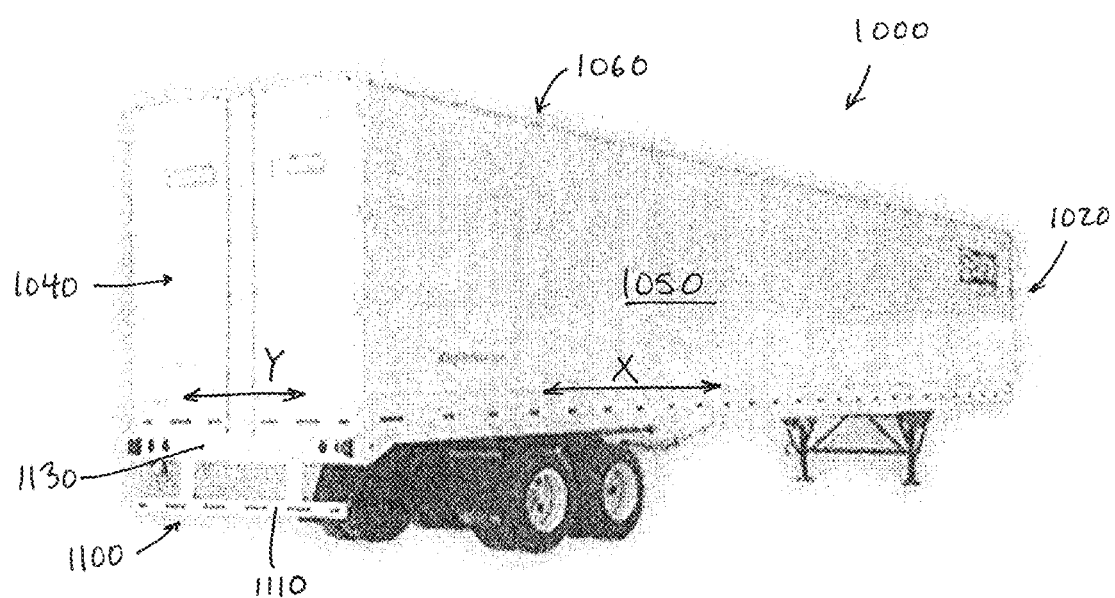
FIG. 1 is a perspective view of a trailer, including a rear impact guard of a prior art construction.

FIGS. 2 to 11 illustrate a portion of a trailer 100, which in some embodiments can be a trailer configured for over-the-road use with a road tractor (e.g., in forming a so-called 18-wheeler) to transport large amounts of cargo. Aspects of the invention may not be limited to such types of trailers however, and it will be understood that features described herein may also apply to many other types of trailers, including those typically having rear impact guards, and others that may not. Similar to that of FIG. 1, the trailer 100 can include a chassis having axles with multiple sets of wheels. The trailer 100 defines a length in a longitudinal or transport direction between its front and rear ends. The length of the trailer 100 can be 53 feet in some constructions, although the trailer 100 can be manufactured to other lengths greater than or less than 53 feet. Perpendicular to the longitudinal direction, the trailer 100 defines a width and a height. The width cooperates with the length to define a plan view footprint of the trailer 100, while the height is measured perpendicular to the footprint (which can be perpendicular to the ground). Subtracting for wall thicknesses, the length, the width, and the height cooperate to define a cargo-receiving interior volume of the trailer 100. The illustrated trailer 100 includes sidewalls, a roof, and a floor, although in other embodiments the trailer only has a floor, or only has a floor and less than four complete sidewalls. While not shown in entirety, the illustrated trailer 100 is an enclosed trailer, but the trailer may be a non-enclosed trailer in other constructions. In any construction, the trailer 100 defines a cargo area operable to receive a load of cargo for transport. Longitudinal top rails and longitudinal bottom rails 104 extend along the length of the trailer 100 at the lateral side edges at the tops and bottoms of the lateral sidewalls, respectively. At a rear of the trailer 100 as shown in FIG. 2, an opening is provided to selectively access the cargo area for loading and unloading cargo. One or more doors may be provided to selectively close the opening. The trailer 100 also has a load floor 106 for receiving and supporting cargo for transport.

At the rear end of the trailer 100, two vertically-extending rear frame posts 108 are provided. The rear frame posts 108 define the lateral sides of the opening into the cargo area of the trailer 100. Along with the longitudinal upper rails, the longitudinal bottom rails 104 terminate at and are secured to the corresponding rear frame posts 108. The rear frame posts 108 can have a hollow box structure, or other suitable construction. A rear sill or bolster 128 of the trailer frame extends along a bottom rear edge of the cargo area and has two opposing lateral distal ends secured to (e.g., welded to) the two rear frame posts 108. Below the load floor 106, a plurality of spaced-apart cross-members 112 or floor joists are provided. The cross-members 112 can be spaced at intervals throughout the entire length of the trailer 100, each cross-member 112 extending along a respective horizontal axis that is transverse to the longitudinal direction of the trailer 100. A pair of longitudinally-extending slider rails 116 (one shown in FIG. 4) extend underneath the cross-members 112 in the rear section of the trailer 100. The suspension supporting the wheels of the trailer 100 is coupled to the slider rails 116, allowing a certain amount of movement of the suspension relative to the slider rails 116. The bottom rails 104, the rear frame posts 108, the cross-members 112, and the slider rails 116, along with additional components described below form a frame of the trailer 100.

A rear impact guard 120 is provided at the rear end of the trailer 100, and is secured to the trailer frame. The rear impact guard 120 includes a plurality of elements structurally coupled to the trailer frame generally below the rear opening of the trailer 100. The rear impact guard 120 can include a bumper 124 extending along a horizontal axis across the rear of the trailer 100 at a height spaced below the cargo area. The bumper 124 can extend parallel and directly below the rear bolster 128 of the trailer frame. The bumper 124 may take any number of constructions, including hollow tubular forms having a circular, rectangular, or square cross-section, among others. The illustrated bumper 124 is of tubular form, and has a modified square cross-section with four equal-length sides. The cross-section of the bumper 124 can be consistent throughout its length along an axis A that extends parallel to the widthwise or transverse direction of the trailer, perpendicular to the longitudinal direction. In the illustrated embodiment, the bumper 124 forms the lowest point of the rear impact guard 120 and extends across the entire width of the trailer 100, or at least within 100 mm of the lateral extremities of the trailer 100, although other bumper dimensions are possible. Multiple structures support the bumper 124 relative to the frame of the trailer 100, including at least one inboard post 132 (e.g., a pair as shown). In some embodiments, the inboard posts 132 are positioned within the central 70 percent of the width of the bumper 124. Additionally, a diagonal truss 136 is provided at each distal end of the bumper 124. In some embodiments, the diagonal trusses 136 are connected to the bumper 124 outside of the central 90 percent or outside of the central 95 percent of the bumper 124. Each diagonal truss 136 extends from the bumper 124 along an axis D diagonally upwardly, forwardly, and inwardly in a direction towards a longitudinal center of the trailer 100.

Figure 10:
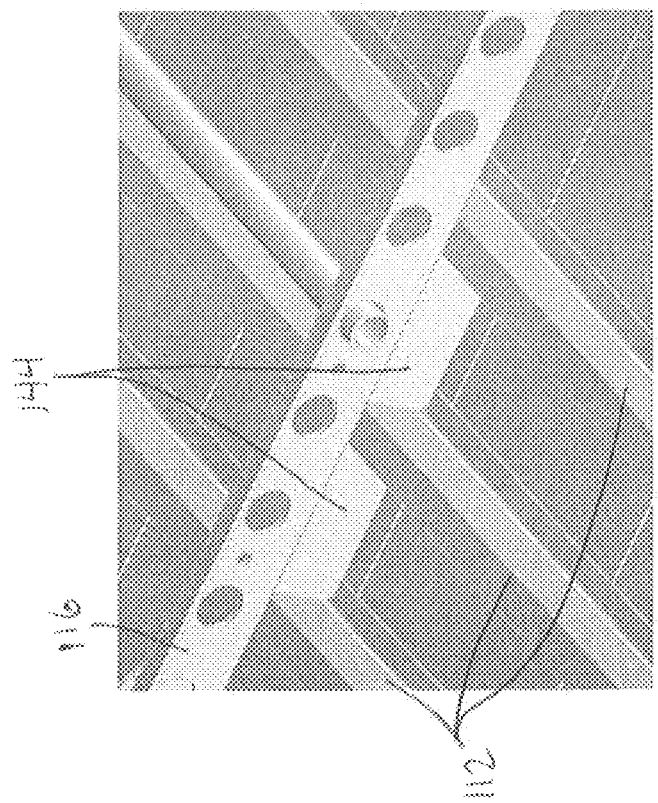
FIG. 10 is a perspective view illustrating a plurality of stiffener members between adjacent cross members of the trailer frame of FIG. 2.
Figure 11:
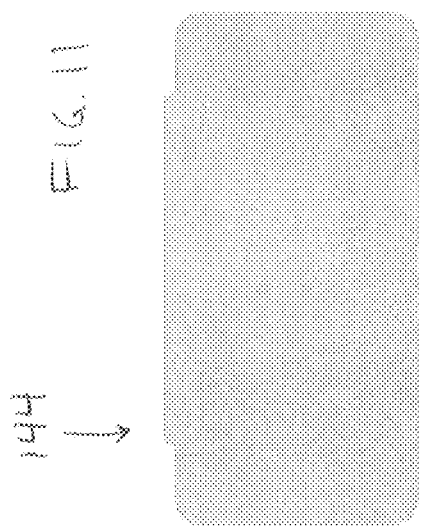
FIG. 11 is a side view of one of the stiffener members of FIG. 10.

In some embodiments, the diagonal trusses 136 can be members of hollow tubular form, and can be constructed of steel, although other metals, non-metallic materials, composites, carbon fiber, and other materials may be used. For example, each of the diagonal trusses 136 can have a circular cross-section with an outside diameter not greater than 3.5 inches (e.g. 3-inch outside diameter) and can have a wall thickness of 0.125 inch. Although this type of diagonal truss 136 provides a good strength-to-weight ratio (where strength refers particularly to the stiffness or buckling resistance provided by the moment of inertia and the material's elastic modulus), other constructions are possible. For example, diagonal trusses can be constructed of round tubing of more than 3.5 inch outside diameter (e.g., 4-inch outside diameter), or of tubing having a non-round cross-sectional shape, such as square and non-square rectangular. The upper, forward end of each diagonal truss 136 can be cut with a shape (i.e., truncated to a point) to fit into a 90-degree angle bracket 140 secured to the corresponding slider rail 116 (e.g., with removable fasteners, such as bolts). The upper, forward end of the diagonal truss 136 can be laser cut in those cases where a higher degree of connection precision is desired. As shown in FIGS. 5 and 6, the trailer frame can be further reinforced between each slider rail 116 and the corresponding rear frame post 108 by a diagonal tension strap 142 that is a separate member from the diagonal truss 136. The diagonal tension strap 142 lies generally horizontally at a height at or below the lower edges of the cross-members 112. Each end of the diagonal tension strap 142 may be welded in place, although non-permanent, removable fasteners (e.g., bolts) can be used as desired. At the rearward end, the diagonal tension strap 142 may be secured at a joint between the rear frame post 108 and the rear bolster 128. Upon the distal end of the bumper 124 receiving a rear impact force, the diagonal tension strap 142 acts as a load distributor. Load transfers from the bumper 124 into the diagonal truss 136, into the floor, and then the tension strap 142 is pulled by the load into the slider rail 116, which then pulls on the rear frame and the sidewall. As such, the slider rail 116 need not be capable of handling as much load by itself. Furthermore, as shown in FIGS. 10 and 11, one or more stiffener members 144 (e.g., intercostal stiffener plates) can be secured between adjacent cross-members 112. As shown, the stiffener members 144 are located at the point of overlap with each of the slider rails 116 (one shown). Each stiffener member 144 can be a flat plate having an outer profile complementary to the adjacent cross-members 112. The stiffener members 144 can be secured in place by welds between the stiffener member 144 and the adjacent cross-members 112.

At its lower, rear end, each diagonal truss 136 can be provided with a mounting bracket 146 for attachment to the bumper 124. Each mounting bracket 146 can be a separate element attached to the lower end of the respective diagonal truss 136 (e.g., by welding or fasteners), or can instead be integrally formed with the lower end of the respective diagonal truss 136. For example, the mounting bracket 146 can be secured (e.g., via welding) within a cutout or notch 136A (e.g., a 90-degree square notch, see FIGS. 3 and 5) formed in the end of the tubular member forming the diagonal truss 136. The mounting bracket 146 can have a non-flat shape that conforms to a portion of an outer surface of the bumper 124. Although the mounting bracket 146 can form the direct interface with the outside profile of the bumper 124, the notch 136A conforms to and receives both a top side 124A of the bumper 124 and a forward side 124B of the bumper 124 as shown in FIGS. 3 and 5. The top and forward sides 124A, 124B can be oriented perpendicular to one another (e.g., horizontal and vertical). In other embodiments, the mounting bracket 146 extends to and is attached to a single wall of the bumper 124. The mounting bracket 146 can be a plate of uniform thickness (e.g., formed by bending a flat plate), or can take any other shape desired. In the illustrated embodiment as best shown in FIGS. 7 and 9, the bottom end notch 136A of the tubular member forming the diagonal truss 136 generally conforms to the non-flat shape of the outer surface of the bumper 124. The notch 136A at the bottom end of the tubular member forming the diagonal truss 136 can be laser cut in those cases where a higher degree of connection precision is desired. It should also be noted that the bracket 146 may be modified, replaced by, or supplemented with a bracket (not shown) that is welded to the bumper 124 so as to avoid direct securement to the bumper 124 with removable fasteners. However, such a bracket welded onto the bumper 124 can have a portion extending away from the bumper 124 (e.g., up above the bumper and/or forwardly of the bumper) and providing one or more mounting holes for respective fasteners so that the bumper is removably, not permanently, secured in place and is replaceable. This variation of a mounting bracket welded to the bumper 124 applies also to any of the other brackets disclosed herein as having mounting holes for bolting directly to the bumper 124, including those where multiple brackets on the bumper 124 are provided.

Also attached to each distal end of the bumper 124 (e.g., connecting to the bumper 124 outside of the central 90 percent or outside of the central 95 percent of the bumper 124, in some embodiments) is an additional reinforcing member referred to herein as a vertical truss or vertical stabilizer 150. Each vertical stabilizer 150 can be secured (e.g., with removable fasteners such as bolts, or permanently, such as by welding) between the rear bolster 128 and the bumper 124. In the illustrated construction, each of the upper and lower ends of the vertical stabilizer 150 includes at least one mounting hole 150A. At the upper end, the mounting hole 150A is provided for connection (e.g., for bolting) with a forward (i.e., interior-facing) surface 128B of the rear bolster 128 that is opposite a rearward (exterior-facing) surface 128B. The lower end of the vertical stabilizer 150 may utilize the same mounting bracket 146 as the diagonal truss 136 for attachment to the distal end of the bumper 124. As shown, the vertical stabilizer 150 extends along a vertical axis, parallel to and inboard of the corresponding rear frame post 108, as viewed from both the rear and the side. However, the vertical stabilizer 150 may extend along a non-vertical axis within a vertical plane to facilitate carrying a vertical load that helps stabilize column loading on the diagonal truss 136 in the event of an impact to the bumper 124. In yet other constructions, the vertical stabilizer 150 may extend along an axis that is primarily vertical (e.g., within 10 degrees, 20 degrees, or 30 degrees of a vertical plane). The illustrated vertical stabilizer 150 is formed of a hollow tubular member having flattened ends provided with mounting apertures. As mentioned, the bottom end of the vertical stabilizer 150 may be bolted to the bumper 124 through the mounting bracket 146. At the top end, the vertical stabilizer 150 may be bolted directly to a mounting bracket 154 that is welded or otherwise secured to the rear bolster 128 (see FIGS. 5, and 7-8) and/or the rear frame post 108 at the joint between the rear bolster 128 and the rear frame post 108. In some constructions, the vertical stabilizer 150 can be formed by a steel tube of not greater than 2.0-inch (e.g., 1.5-inch) outer diameter and wall thickness of 0.083 inch. However, other constructions may utilize other elements having various sizes and materials. For example, the vertical stabilizer 150 can be a solid, non-tubular member as shown in FIGS. 12-13, and in some cases can be a non-rigid member such as a cable only operable to carry tension loading.

The design of the diagonal truss 136 and the vertical stabilizer 150 allows them to be provided to the trailer frame in a bolt-on manner, and further allows the bumper 124 to be provided to the rear impact guard 120 in a bolt-on manner. As shown in the accompanying drawing views, the inboard posts 132 can also be provided as bolt-on components between the trailer frame and the bumper 124. However, in alternative embodiments, some or all of the connections between the trailer frame and the inboard posts 132, the diagonal trusses 136, and the vertical stabilizers 150 and/or between the bumper 124 and the inboard posts 132, the diagonal trusses 136, and the vertical stabilizers 150 may be of a permanent, non-removable type such as by welding ("non-removable" referring to the inability to remove without damage or destruction). For example, the lower ends of the inboard posts 132, the diagonal trusses 136, and/or the vertical stabilizers 150 can be welded directly to the bumper 124. In such embodiments, the mounting bracket 146 may be omitted, and the general shape at the lower end of the diagonal truss 136 can be the same as described above to wrap around the bumper 124. If the lower ends of any or all of the inboard posts 132, the diagonal trusses 136, and the vertical stabilizers 150 are welded, but the upper ends retain a bolt-on arrangement, the rear impact guard 120 as a whole can be provided in a bolt-on manner to the trailer frame. By limiting the amount of components of the rear impact guard 120 that are made integral with the trailer frame, the rear impact guard 120 and/or components thereof may be serviceable in the field with minimal time and cost, and with minimal risk of damaging the trailer. For example, in the event of cosmetic or minimal damage to a vertical stabilizer 150, a diagonal truss 136, or the bumper 124, the individual component (or the rear impact guard 120 as a whole) may be removed from the trailer frame, simply by removing bolted connections, and then replaced. Although bolts and nuts may be utilized throughout the rear impact guard 120 as shown and described, it will be understood that other types of threaded fasteners may instead be utilized, as can any other type of removable fastener. In this regard, as used herein and in the appended claims the term "bolt-on" shall not be interpreted as limiting specifically to the use of bolts.

Figure 12:
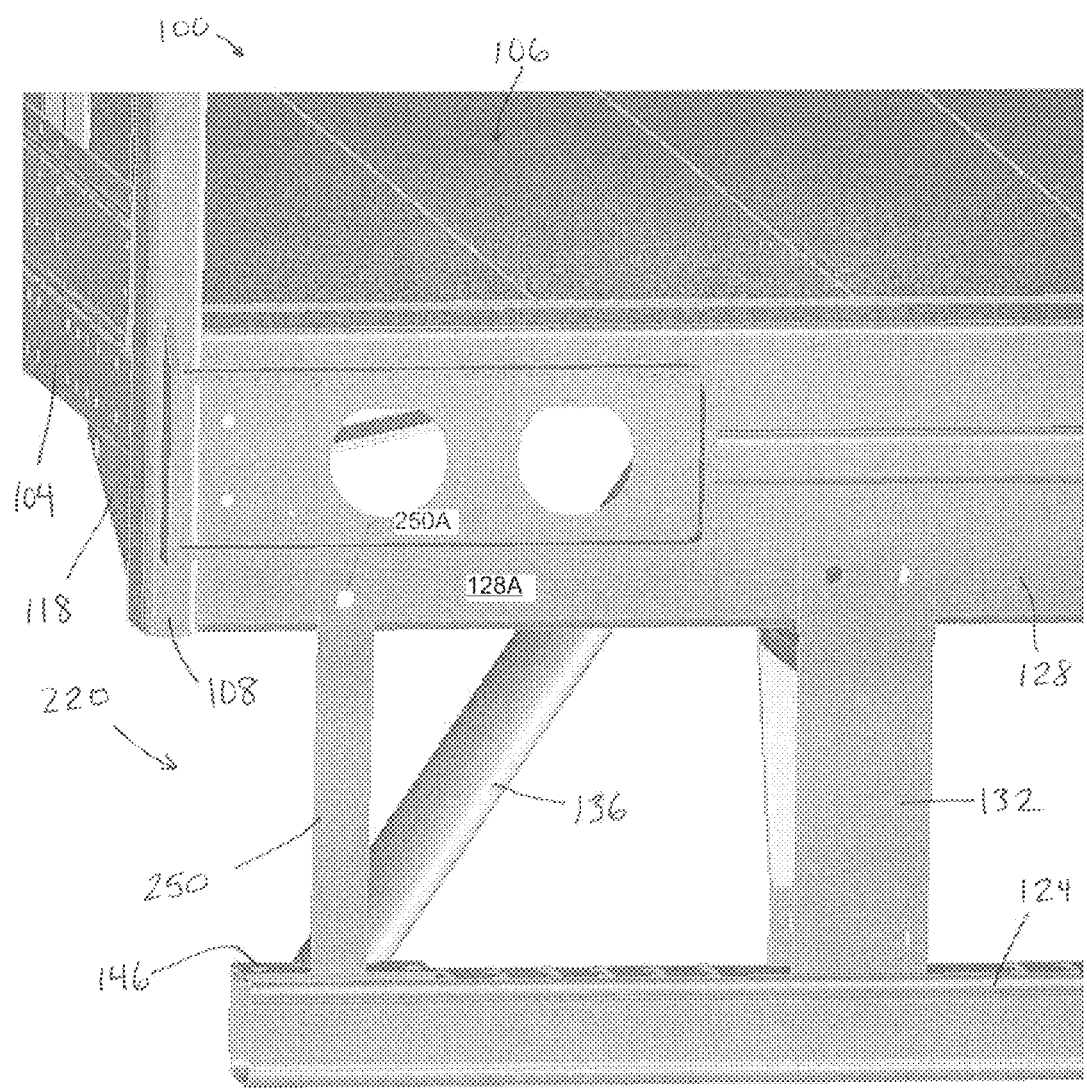
FIG. 12 is a perspective view of a portion of a trailer including a rear impact guard according to another embodiment of the present invention.
Figure 13:
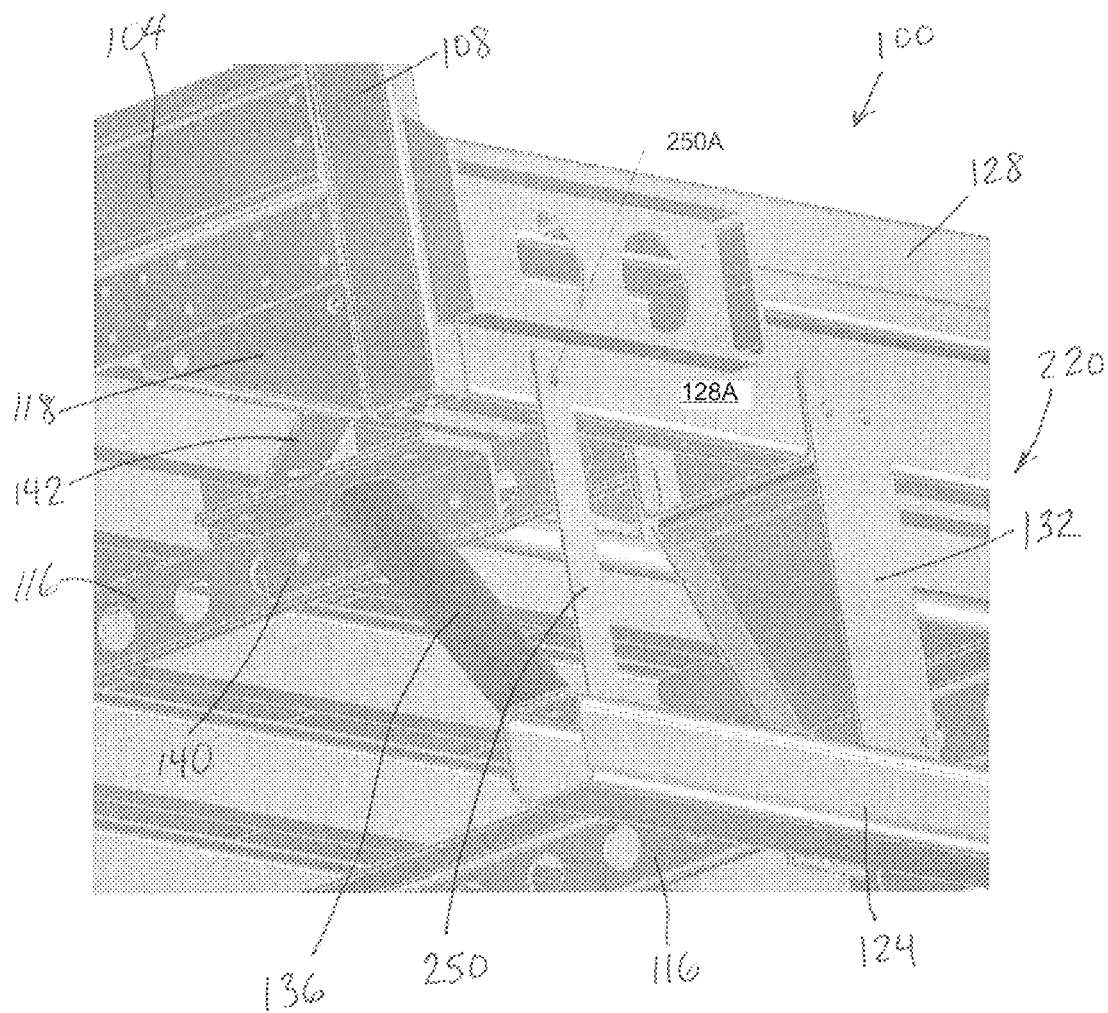
FIG. 13 is an alternate perspective view of the rear impact guard of FIG. 12.
Figure 20:
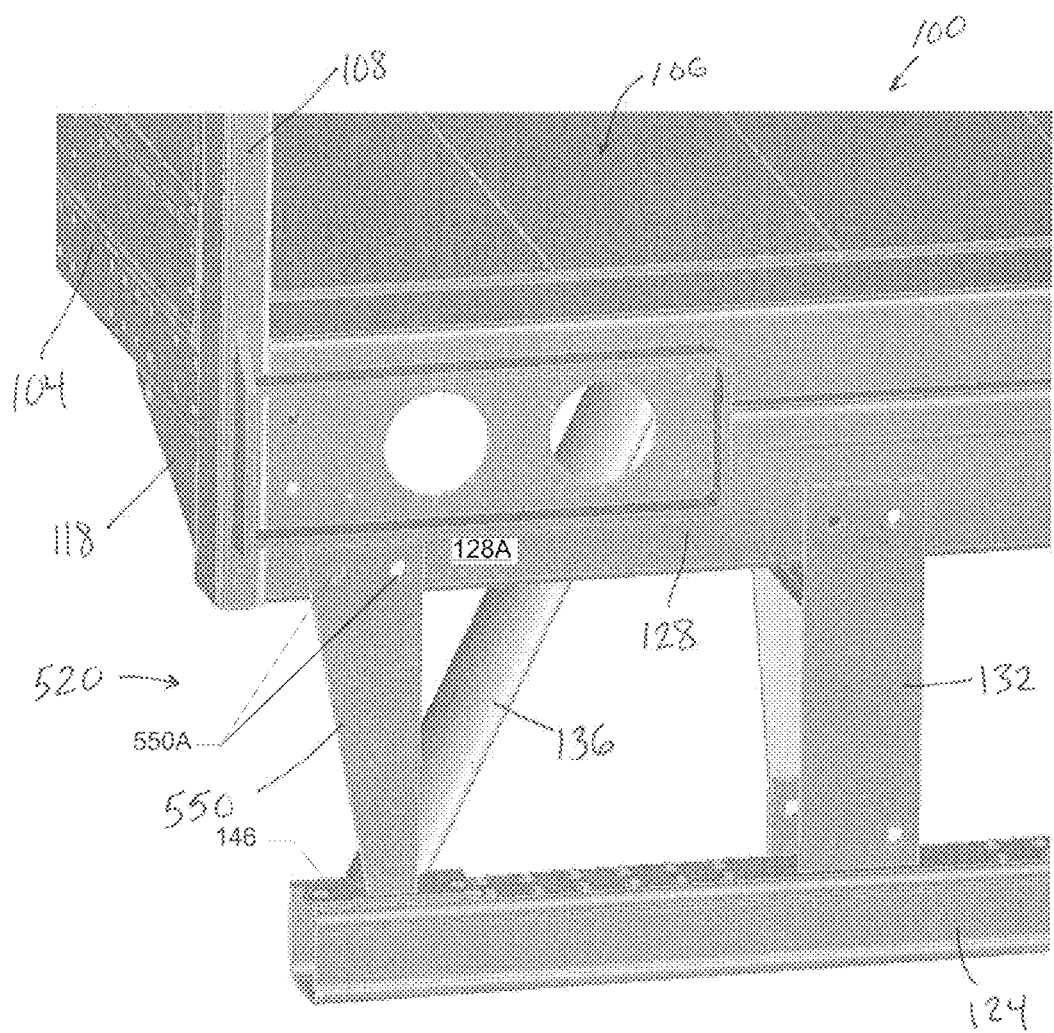
FIG. 20 is a perspective view of a portion of a trailer including a rear impact guard according to another embodiment of the present invention.
Figure 21:
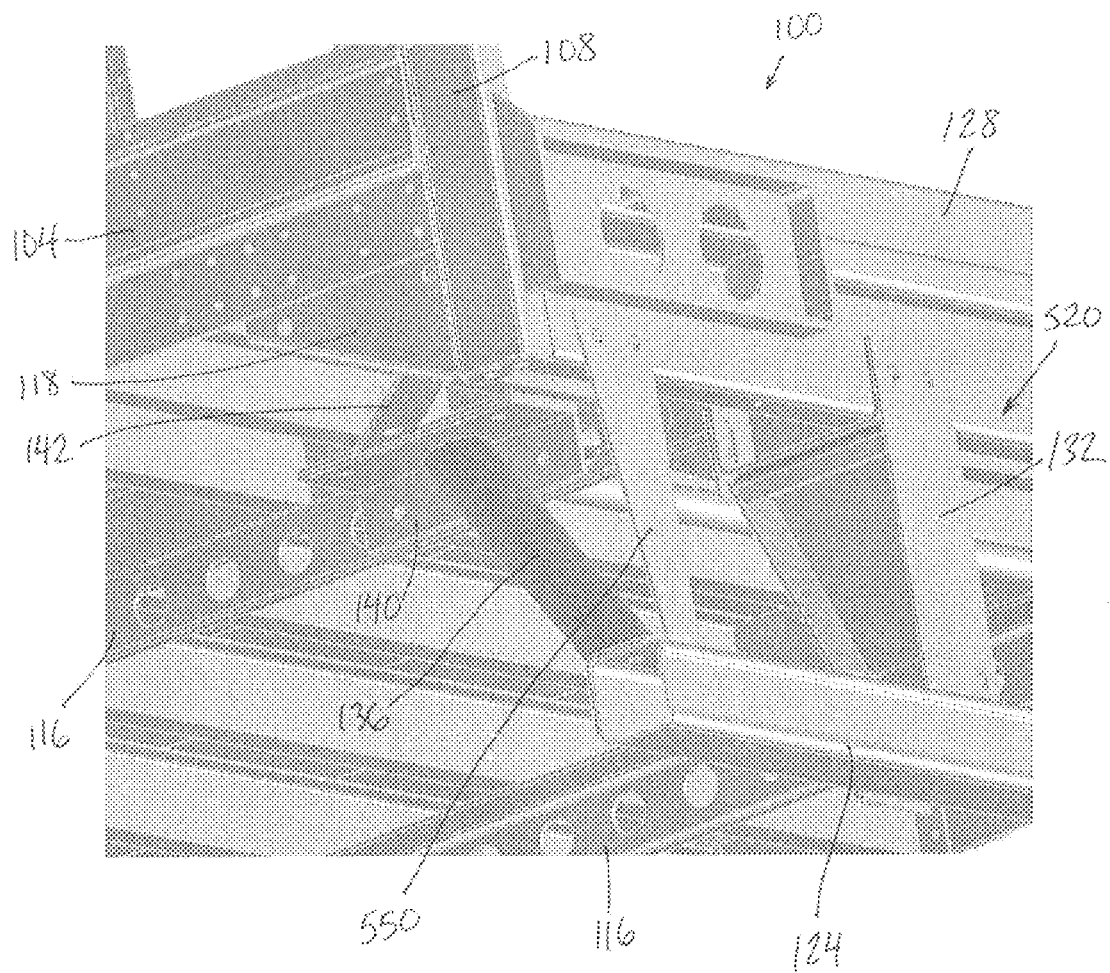
FIG. 21 is an alternate perspective view of the rear impact guard of FIG. 20.

FIGS. 12-13 illustrate a portion of a trailer 100 and rear impact guard 220 according to another embodiment. Except where otherwise noted, the above description applies, and identical reference numbers are maintained for ease of understanding. As shown, the rear impact guard 220 includes a bumper 124 coupled to the trailer frame with inboard posts 132, diagonal trusses 136, and vertical stabilizers 250 provided as flat bars or straps (e.g., of steel plate material). The upper end of the vertical stabilizer 250 can be provided with at least one mounting hole 250A for bolting to the rear bolster 128 (e.g., to the rear surface 128A). The lower end of the vertical stabilizer 250 can be welded to the mounting bracket 146 for attachment with the bumper 124, although the vertical stabilizer can be permanently secured at both ends, or can be releasably secured at both ends by bolts or other releasable fasteners, as desired. As with the vertical stabilizer 150 described above, the vertical stabilizer 250 of FIGS. 12-13 is operable to stabilize the column loading incident upon the diagonal truss 136 by carrying a vertical load component in the event of an impact to the rear bumper 124. As such, the diagonal truss 136 is able to withstand significantly higher compression loading without substantial buckling. FIGS. 20-21 illustrate a portion of a trailer 100 and a rear impact guard 520 that is similar to FIGS. 12-13 in that it utilizes a flat bar or strap as a vertical stabilizer 550. However, the vertical stabilizer 550 has a non-uniform cross-section along its length, whereas the vertical stabilizer 250 has a uniform or consistent cross-section along its length. The vertical stabilizer 550 of FIGS. 20-21 has a laterally-measured width that tapers down from a maximum at its upper end to a minimum at its lower end. Similar to the vertical stabilizer 250, the vertical stabilizer 550 extends along the rear surface 128A of the rear bolster 128 and has at least one mounting hole 550A at its upper end for bolting to the rear bolster 128.

Figure 16:
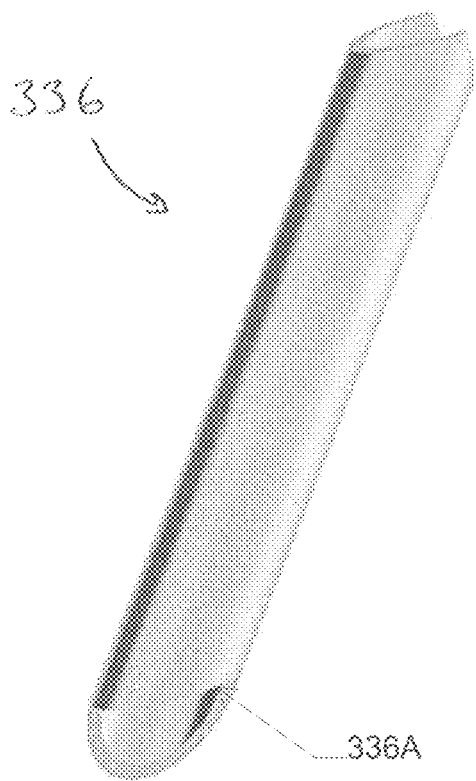
FIG. 16 is a rear view of a diagonal truss of FIGS. 14 and 15.
Figure 17:
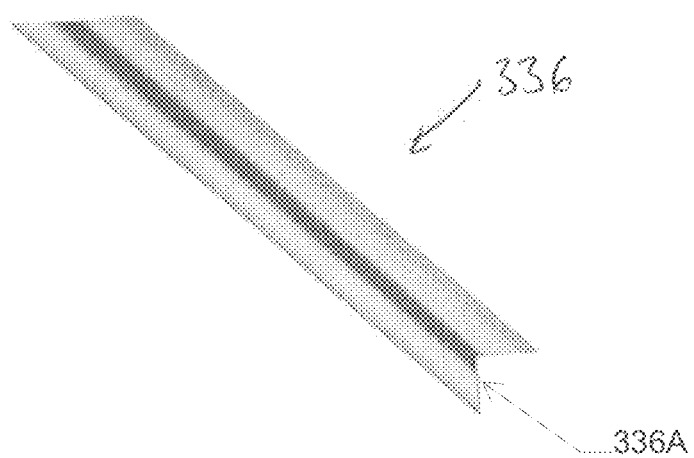
FIG. 17 is a side view of the diagonal truss of FIG. 16.

FIGS. 14-17 illustrate a portion of a trailer 100 and rear impact guard 320 according to another embodiment. Except where otherwise noted, the above description applies, and identical reference numbers are maintained for ease of understanding. As shown, the rear impact guard 320 includes a bumper 124 coupled to the trailer frame with inboard posts 132 and diagonal trusses 336, but without any vertical stabilizers provided between the distal ends of the bumper 124 and the rear bolster 128. As such, the diagonal trusses 336 are provided with an increased load-carrying capacity compared to those of the above-described embodiments such that the rear impact guard 320 as a whole is of comparable strength. For example, the diagonal trusses 336 can be larger in size (e.g., 4.0 inch outer diameter or greater with 0.125 inch wall thickness or greater) to increase moment of inertia, and may optionally be of a material having a higher modulus of elasticity. Although the constructions of FIGS. 2-13 enable high performance with more modestly-sized diagonal trusses 136, which can help achieve weight and cost targets, the construction of FIGS. 14-17 can be utilized in cases where vertical stabilizers are not desired at the distal ends of the bumper 124. Similar to the disclosure above with respect to the first described embodiment, the diagonal truss 336 can be formed with a notch 336A that conforms to and receives both a top side 124A of the bumper 124 and a forward side 124B of the bumper 124 as shown in FIGS. 15-17.

FIGS. 18-19 illustrate a portion of a trailer 100 and rear impact guard 420 according to another embodiment. Except where otherwise noted, the above description applies, and identical reference numbers are maintained for ease of understanding. As shown, the rear impact guard 420 includes a bumper 124 coupled to the trailer frame with inboard posts 132 and diagonal trusses 436, but without any vertical stabilizers provided between the distal ends of the bumper 124 and the rear bolster 128. The diagonal trusses 436 can be similar to the diagonal trusses 336 described above with reference to FIGS. 14-17, but with a different manner of attachment to the bumper 124. In particular, while the diagonal trusses 336 are provided with the notches 336A at their lower ends, the diagonal trusses 436 of FIGS. 18-19 have lower ends that are cut flat, although angled with respect to the axis D of the diagonal truss 436. The lower end of each diagonal truss 436 is secured (e.g., by welding) to a mounting bracket 446 that secures to the bumper 124 (e.g., by welding or releasably fasteners). The mounting bracket 446 can be formed as one or more plates having a shape that conforms to one or more walls of the outside of the bumper 124 (such as to extend along a top side and a forward-facing side of the bumper 124, as shown in FIG. 19) and can thereby receive the bumper 124 therein. Each of the plates or sections of the mounting bracket 446 can lie in a corresponding vertical plane, each angled with respect to the next. Although not shown herein, it is also contemplated that one or both of the ends of any of the diagonal trusses discussed herein can be integrally provided with molded (e.g., cast) end fittings for attachment to the bumper 124 and/or the trailer frame.

Figure 22:
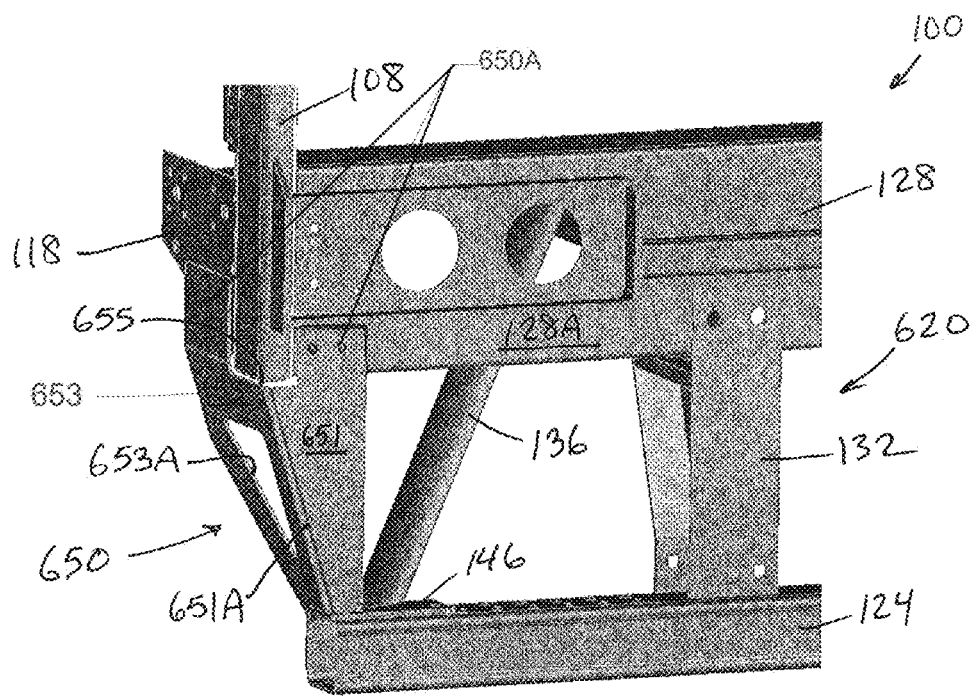
FIG. 22 is a perspective view of a portion of a trailer including a rear impact guard according to another embodiment of the present invention.
Figure 23:
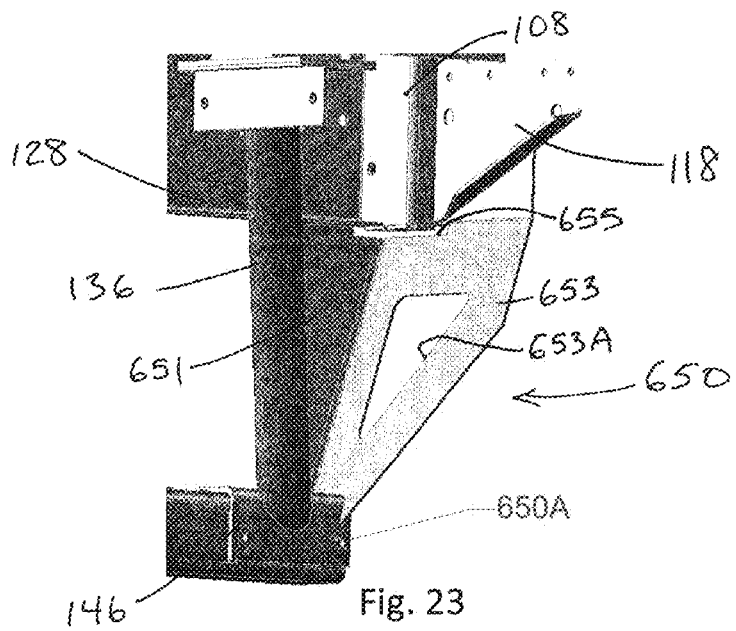
FIG. 23 is a perspective view of a distal end support of the rear impact guard of FIG. 22, including a diagonal truss and an outboard post as a vertical stabilizer.

FIGS. 22 and 23 illustrate a portion of a trailer 100 and rear impact guard 620 according to another embodiment. Except where otherwise noted, the above description applies, and identical reference numbers are maintained for ease of understanding. As shown, the rear impact guard 620 includes a bumper 124 coupled to the trailer frame with inboard posts 132 and diagonal trusses 136, along with multi-dimensional outboard posts 650 as vertical stabilizers between the distal ends of the bumper 124 and the rear trailer frame. Each outboard post 650 includes at least two panels, for example, a rear panel 651 extending along the rear bolster 128 (e.g., the rear surface 128A thereof), and a side panel 653 extending along a lateral side edge of the trailer, forwardly from the rear panel 651. The lower end of the outboard post 650, including both panels 651, 653, can be secured (e.g., by welding) to a common mounting bracket 146 that is secured to the bumper 124. The outboard post 650 includes multiple mounting holes 650A at the upper and lower ends (i.e., at the upper ends of the rear and side panels 651, 653 and at the mounting bracket 146). With the outboard post 650 and the diagonal truss 136 permanently secured by welding to the same mounting bracket 146, the multi-dimensional post 650 and the diagonal truss 136 form separate structural members of an integral or unitary distal end support that is attachable as a unit between the bumper 124 and the rear trailer frame.

As shown, the side panel 653 of FIGS. 22 and 23 is secured to a corresponding corner gusset 118 positioned directly forwardly of a corresponding rear frame post 108, each of which extends vertically up from a distal end of the rear bolster 128. The side panel 653 can extend along and be secured to a laterally-outer vertically-extending surface of the corner gusset 118. At the upper end of the outboard post 650, a recess or notch 655 is formed in part by each of the rear and side panels 651, 653 such that the bottom end of the rear frame post 108 is received therein. As such, the outboard post 650 receives and wraps around the rear frame post 108 where the bottom end of the rear frame post 108 forms a corner joint of the trailer frame with the rear bolster 128 and the corner gusset 118. The portions of the panels 651, 653 that extend vertically up alongside the rear frame post 108 form mounting flanges for securing the rear impact guard 620 to the trailer frame. For example, the upper portion of each panel 651, 653 can provide a mounting tab or mounting flange with one or more mounting holes 650A for non-permanent, removable fasteners (e.g., bolts), although other connections, such as welding, may be provided in other constructions. Optionally, one or both of the panels 651, 653 can include cutouts or apertures to minimize weight. FIGS. 22 and 23 illustrate that one centralized aperture 653A is provided in the side panel 653, however, more or fewer apertures can be provided and at least one aperture can be provided in the rear panel 651, alternately or additionally. As viewed from the rear as in FIG. 22, a laterally-outer edge 651A of the rear panel 651 tapers laterally-inward from the upper end toward the lower end that is secured to the bumper 124. Because the side panel 653 extends forwardly from the laterally-outer edge 651A of the rear panel 651, the side panel 653 as a whole also tapers laterally-inward from the upper end toward the lower end that is secured to the bumper 124.

Figure 24:
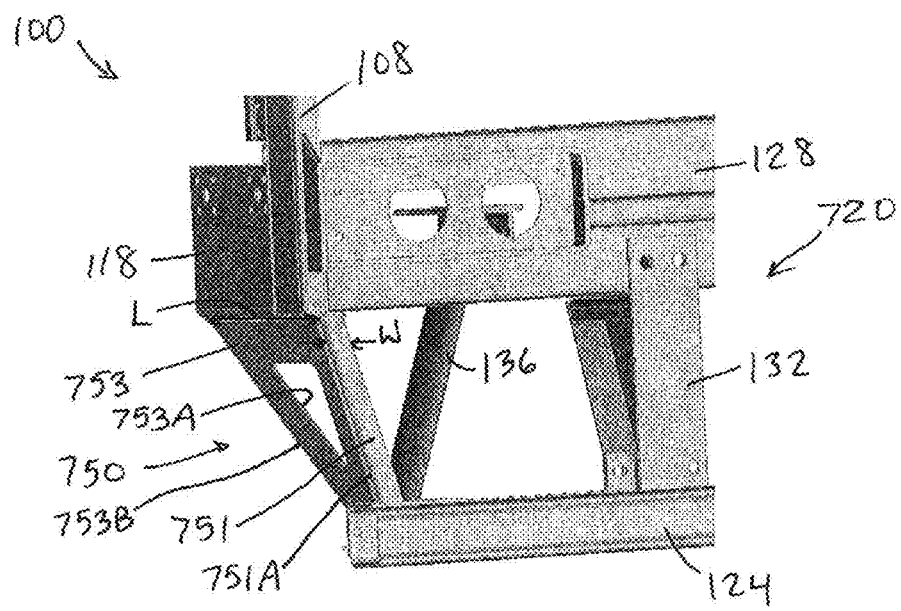
FIG. 24 is a perspective view of a portion of a trailer including a rear impact guard according to another embodiment of the present invention.
Figure 25:
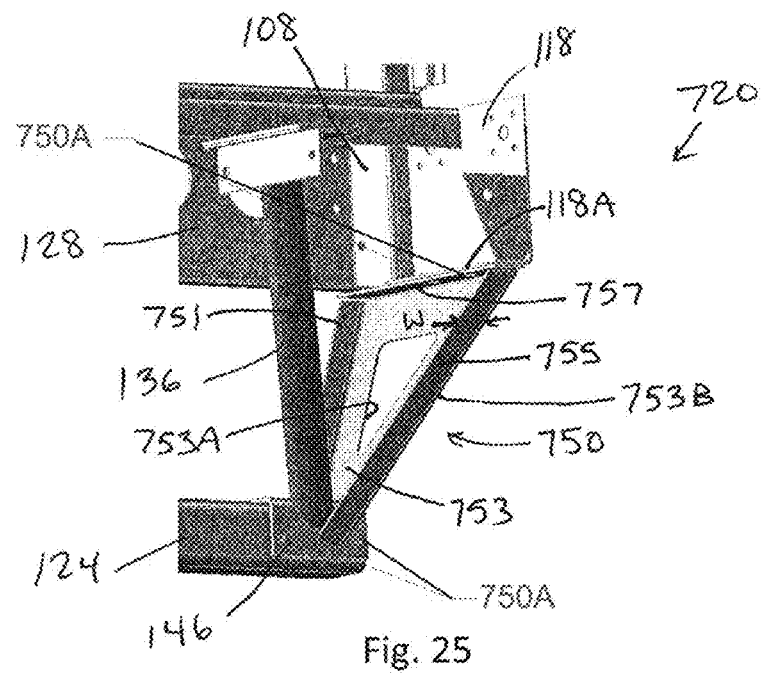
FIG. 25 is a perspective view of a distal end support of the rear impact guard of FIG. 24, including a diagonal truss and an outboard post as a vertical stabilizer.

FIGS. 24 and 25 illustrate a portion of a trailer 100 and rear impact guard 720 according to another embodiment. Except where otherwise noted, the above description applies, and identical reference numbers are maintained for ease of understanding. As shown, the rear impact guard 720 includes a bumper 124 coupled to the trailer frame with inboard posts 132 and diagonal trusses 136, along with multi-dimensional outboard posts 750 as vertical stabilizers between the distal ends of the bumper 124 and the rear trailer frame. Each outboard post 750 includes at least three panels, for example, a rear panel 751 extending parallel to the rear bolster 128 (e.g., the rear surface 128A thereof), a side panel 753 extending along a lateral side edge of the trailer, forwardly from the rear panel 751, and a forward panel 755 extending from a forward inclined edge 753B of the side panel 753. The lower end of the outboard post 750, including all panels 751, 753, 755, can be secured (e.g., by welding) to a common mounting bracket 146 that is secured to the bumper 124. For example, as shown in FIG. 25, the lower end of the outboard post 750 can be provided with mounting holes 750A in the mounting bracket 146 for alignment with corresponding mounting holes in the bumper 124.

As shown in FIG. 25, the outboard post 750 includes a horizontally-extending top panel 757 that is secured to a corresponding corner gusset 118 positioned directly forwardly of a corresponding rear frame post 108. For example, the top panel 757 can extend directly along and be secured to a horizontally-extending bottom flange or panel 118A of the corner gusset 118. The top panel 757 of the post 750 can include multiple mounting holes 750A, and the bottom panel 118A of the corner gusset can have matching mounting holes to receive one or more fasteners (e.g., bolts). The top panel 757 can alternately or additionally be secured to one or both of the rear bolster 128 and the rear frame post 108, as the top panel 757 has portions extending directly along bottom end surfaces of both of the rear bolster 128 and the rear frame post 108. The outboard post 750 spans a corner joint of the trailer frame where the rear frame post 108 mates with the rear bolster 128 and the corner gusset 118. As shown, the side panel 753 can include a cutout or aperture 753A similar to the side panel 653 of FIGS. 22 and 23, and additional apertures or alternately-shaped apertures may be provided. The rear and forward panels 751, 755 can have a reduced surface area compared to the rear panel 651 of FIGS. 22 and 23. For example, a laterally-measured width W of each panel 751, 755 can be consistent along the vertical direction, and the width W can be less than half or less than a third of a maximum longitudinal length L of the side panel 753 as measured at its upper end. The width W can be less than 3 inches. As described above with reference to FIGS. 22 and 23, the laterally-outer edge 751A of the rear panel 751 tapers laterally-inward from the upper end toward the lower end that is secured to the bumper 124. Because the side panel 753 extends forwardly from the laterally-outer edge 751A of the rear panel 751, the side panel 753 as a whole also tapers laterally-inward from the upper end toward the lower end that is secured to the bumper 124.

Figure 26:
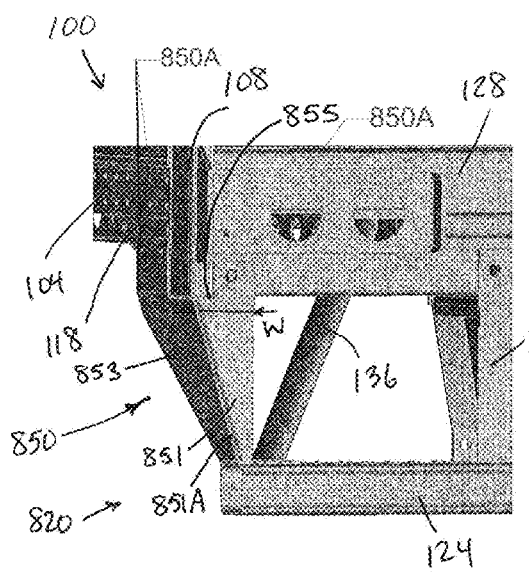
FIG. 26 is a perspective view of a portion of a trailer including a rear impact guard according to another embodiment of the present invention.
Figure 27:
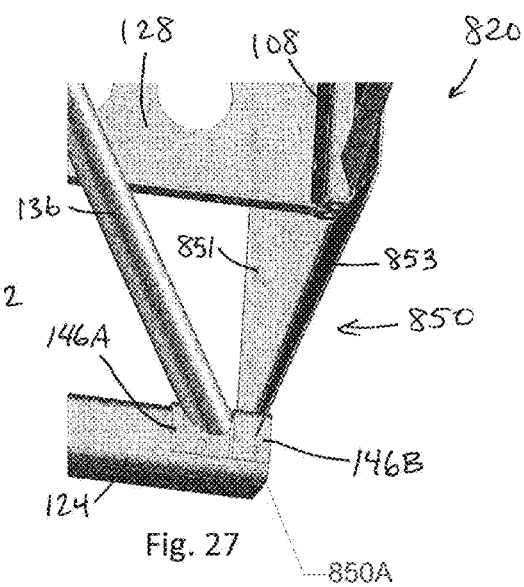
FIG. 27 is a perspective view of a distal end support of the rear impact guard of FIG. 26, including a diagonal truss and an outboard post as a vertical stabilizer.
Figure 28:
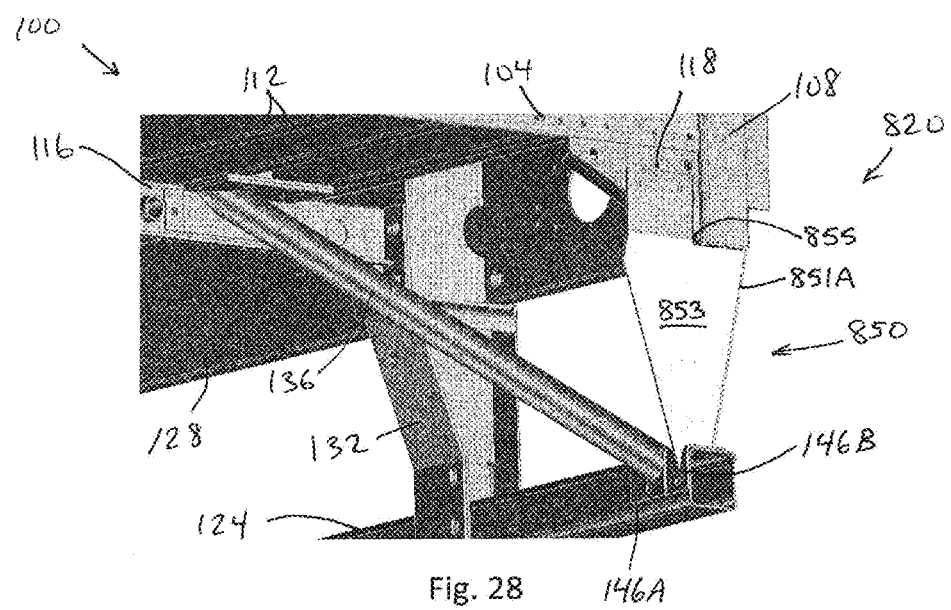
FIG. 28 is an alternate perspective view of the distal end support of the rear impact guard of FIG. 26, including the diagonal truss and the outboard post.

FIGS. 26 to 28 illustrate a portion of a trailer 100 and rear impact guard 820 according to another embodiment. Except where otherwise noted, the above description applies, and identical reference numbers are maintained for ease of understanding. As shown, the rear impact guard 820 includes a bumper 124 coupled to the trailer frame with inboard posts 132 and diagonal trusses 136, along with multi-dimensional outboard posts 850 as vertical stabilizers between the distal ends of the bumper 124 and the rear trailer frame. Each outboard post 850 includes two panels, for example, a rear panel 851 extending along the rear bolster 128 (e.g., the rear surface 128A thereof) and a side panel 853 extending along a lateral side edge of the trailer, forwardly from a laterally-outer edge 851A of the rear panel 851. The lower end of the outboard post 850, including both panels 851, 853, can be secured (e.g., by welding) to a distal mounting bracket 146B that is secured to the bumper 124 separately from a proximal mounting bracket 146A securing the diagonal truss 136 to the bumper 124. By separating the bumper attachment of the diagonal truss 136 from that of the outboard post 850 to make them independent connections, aspects of the assembly process can be accomplished more easily as fewer parts need to be aligned simultaneously. Mounting holes 850A for securing the outboard post 850 to the trailer frame and the bumper 124 are provided at the upper ends of the rear and side panels 851, 853 and also at the lower end of the post 850 (e.g., at the distal mounting bracket 146B). It should be noted that the distal mounting bracket 146B and other mounting brackets disclosed herein for fastening to the bumper 124 with removable fasteners (e.g., bolts) can instead be integrated with the bumper 124 (e.g., formed integrally with the bumper 124, welded to the bumper 124, etc.). In such constructions, the lower end of the outboard post 850 can include mounting holes that define a fastener interface spaced above the top side 124A of the bumper 124.

The outboard posts 850 of FIGS. 26-28 are generally similar to embodiments discussed above, including features such as the notch 855 that corresponds to the notch 655 that wraps around the bottom of the rear frame post 108 and separates the respective panels 851, 853 to form mounting flanges or tabs at their upper ends. The rear panel 851 also has a laterally-outer edge 851A that tapers laterally-inward from the upper end toward the lower end, and the side panel 853 as a whole also tapers laterally-inward from the upper end toward the lower end that is secured to the bumper 124. However, in addition to the outboard post 850 having a mounting bracket 146B independent of the diagonal truss 136, the outboard post 850 differs from the post 650 of FIGS. 22 and 23 in at least the following ways. Although one or more cutouts or apertures can be formed in the rear or side panels 851, 853, the illustrated embodiment provides these panels 851, 853 as solid panels, free of any apertures below the notch 855 and above the flange 146B. In addition, and providing an alternate means of minimizing weight, the laterally-measured width W of the rear panel 851, at its maximum point near the upper end, is reduced compared to that of the rear panel 651 in FIGS. 22 and 23. As such, the rear panel 851 may be provided with only a single mounting hole 850A for attachment to the rear bolster 128.

Figure 29:
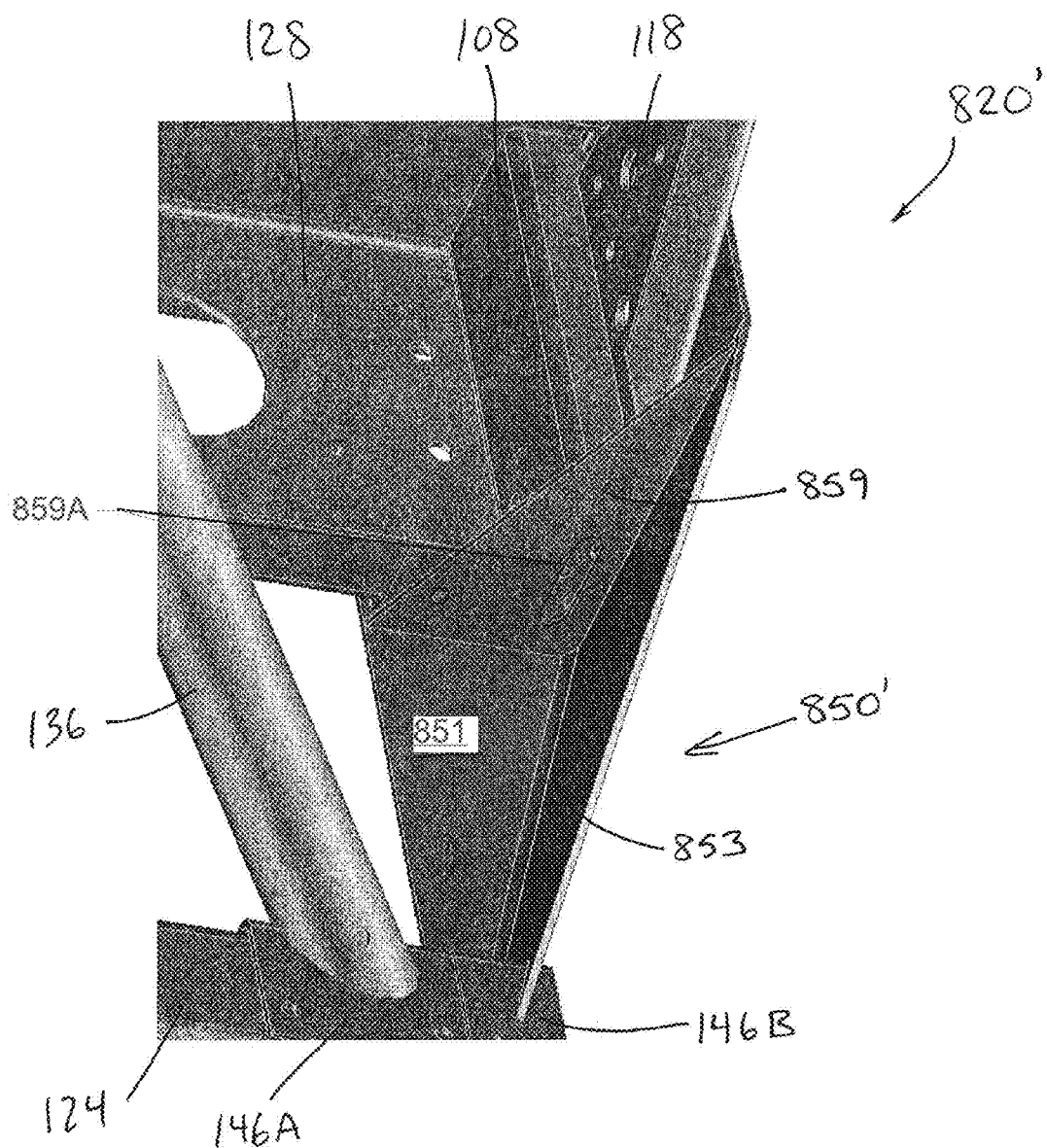
FIG. 29 is a perspective view of a portion of the rear impact guard of FIGS. 26-29 having a modified outboard post including a shear web.
Figure 30:
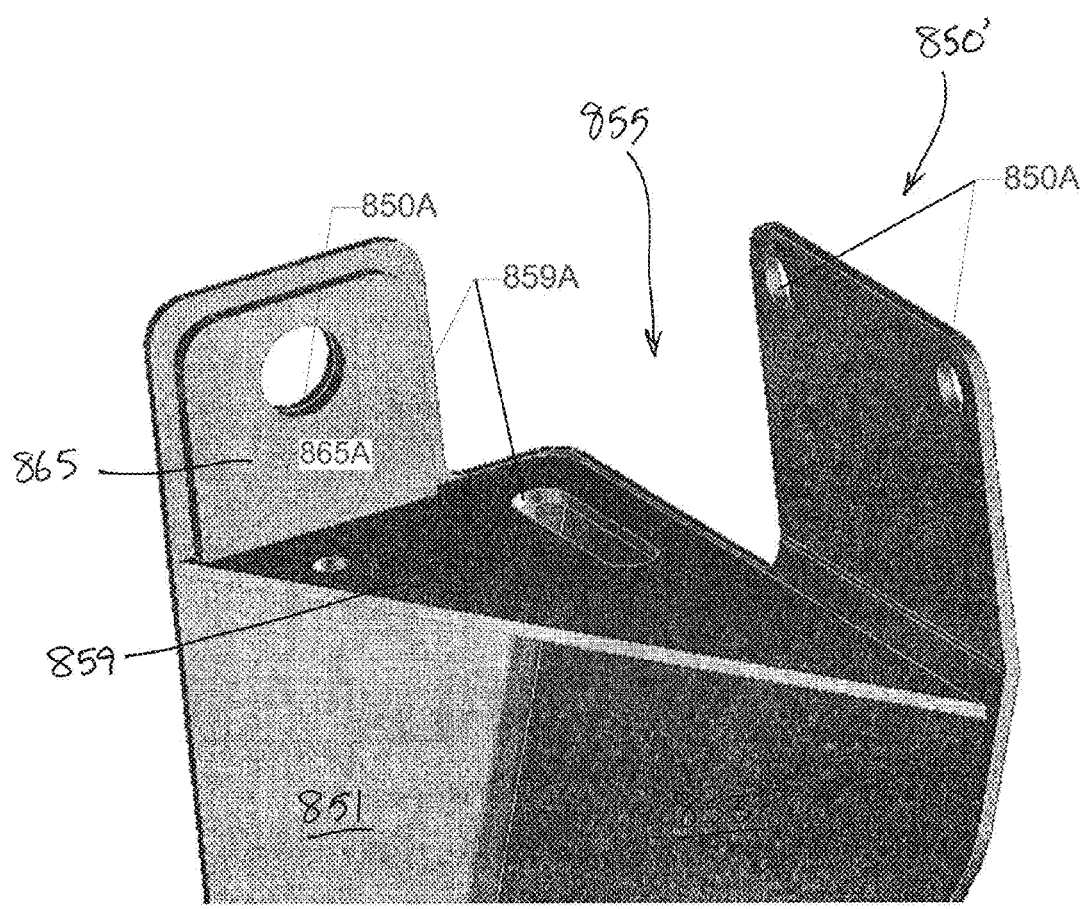
FIG. 30 is a perspective view of the modified outboard post of FIG. 29, further including a back-up plate.

FIGS. 29 and 30 illustrate two optional additions to the outboard post 850 of FIGS. 26-28 that can be provided separately or together to provide an alternate version of the rear impact guard 820' having an alternate outboard post 850'. The first of these is a gusset or shear web 859 provided at the upper end of the outboard post 850', spanning between the rear and side panels 851, 853. The shear web 859 extends in a horizontal plane, perpendicular to the rear frame post 108, between interior surfaces of the rear panel 851 and the side panel 853. In addition, a top surface of the shear web 859 extends along the respective bottom ends of the rear bolster 128, the rear frame post 108, and the corner gusset 118, and can be secured to any one or more of these. The shear web 859 spans a corner joint of the trailer frame where the rear frame post 108 mates with the rear bolster 128 and the corner gusset 118. Multiple mounting holes 859A can be provided in the shear web 859, including at least one elongated hole or slot. In other constructions, a gusset may extend directly between the side panel 853 and the rear frame post 108 and may be welded in place therebetween. The outboard post 850' having additional reinforcement as described above and shown in FIGS. 29 and 30 increases the ability for the rear impact guard 820' to withstand force without deflection, improving performance during an impact, especially an offset impact where high forces are applied at or very near the outboard post 850'. Alternately or additionally, FIG. 30 illustrates that the outboard post 820' can include a back-up plate 865 that lies directly alongside the upper portion of the rear panel 851 where the mounting hole 850A is provided, and the back-up plate 865 is provided with a mounting hole 865A that aligns with the mounting hole 850A of the rear panel 851 so that a fastener that joins the rear panel 851 to the rear trailer frame extends through both mounting holes 850A, 865A, which lie directly side-by-side to effectively form one extended-length aperture for the fastener. The back-up plate 865 can have a sheet or plate construction similar in thickness to that of the rear panel 851, although it may alternately be thinner or thicker. Especially where a single mounting hole 850A is provided at the top of the rear panel 851 for a single fastener, the back-up plate 865 provides much improved resistance to a fastener tearing out of the rear panel 851 in a collision. However, a back-up plate may also be used where two or more mounting holes are provided for fastening an outboard post, and such back-up plates can be provided at any of the mounting holes defining any of the other fastener joints in this or other embodiments.

Figure 31:
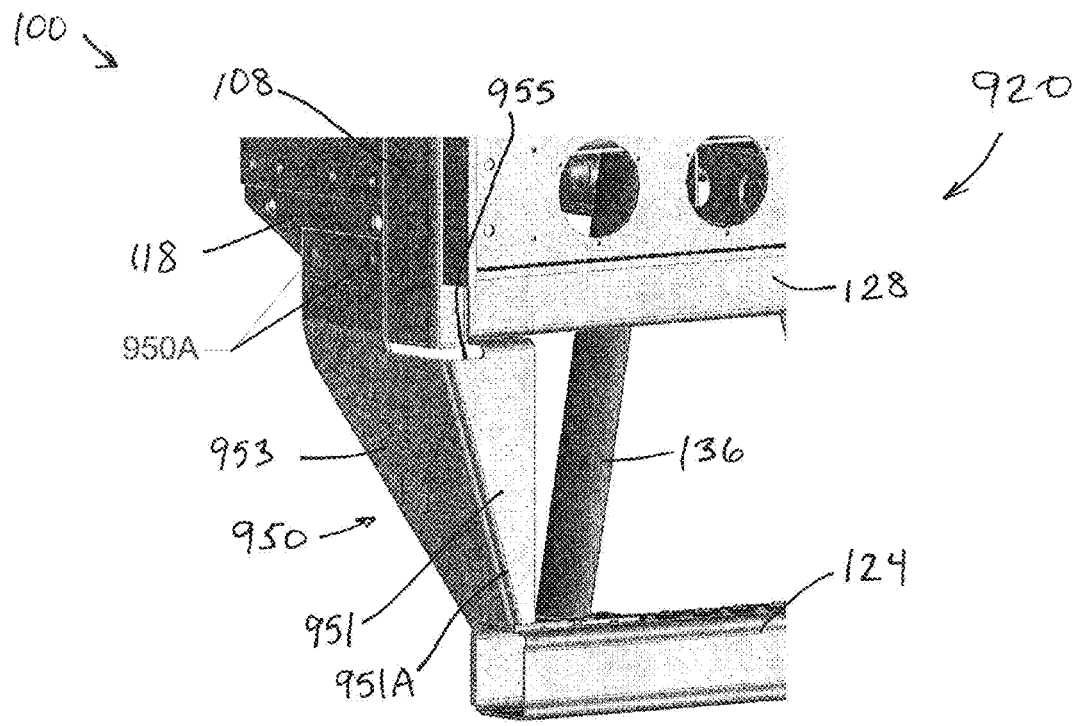
FIG. 31 is a perspective view of a portion of a trailer including a rear impact guard according to another embodiment of the present invention.
Figure 32:
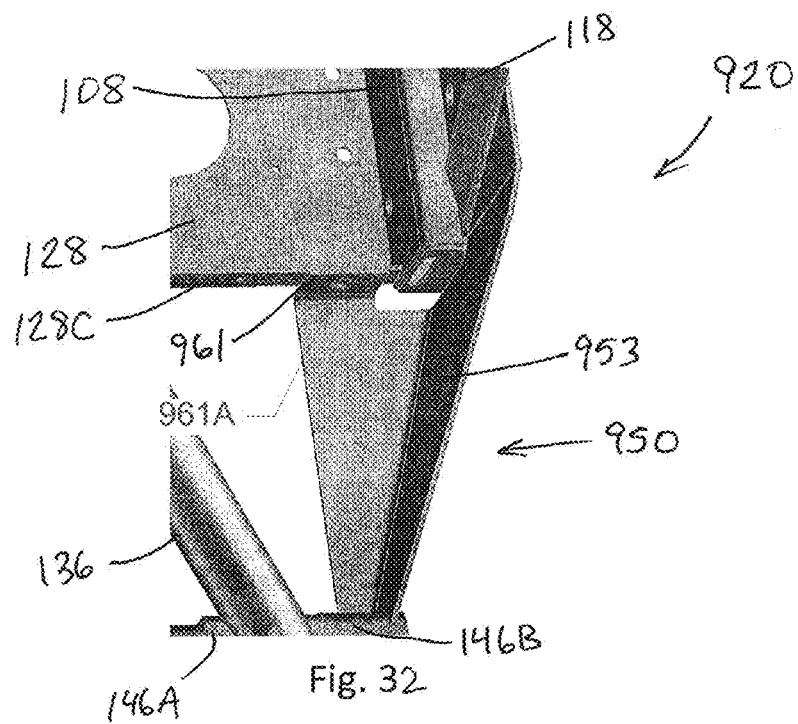
FIG. 32 is perspective view of a distal end support of the rear impact guard of FIG. 31, including a diagonal truss and an outboard post as a vertical stabilizer.

FIGS. 31 and 32 illustrate a portion of a trailer 100 and rear impact guard 920 according to another embodiment. Except where otherwise noted, the above description applies, and identical reference numbers are maintained for ease of understanding. As shown, the rear impact guard 920 includes a bumper 124 coupled to the trailer frame with inboard posts 132 and diagonal trusses 136, along with multi-dimensional outboard posts 950 as vertical stabilizers between the distal ends of the bumper 124 and the rear trailer frame. Each outboard post 950 includes two panels, for example, a rear panel 951 and a side panel 953 extending along a lateral side edge of the trailer, forwardly from a laterally-outer edge 951A of the rear panel 951. The lower end of the outboard post 950, including both panels 951, 953, can be secured (e.g., by welding) to a distal mounting bracket 146B that is secured to the bumper 124 separately from a proximal mounting bracket 146A securing the diagonal truss 136 to the bumper 124 as described above with respect to FIGS. 26-28.

The outboard post 950 is generally similar to the outboard post 850 of FIGS. 26-28, and includes a notch 955 at the upper end that divides upper mounting flange or mounting tab portions of the respective rear and side panels 951, 953. Although the side panel 953 can be oriented and secured to the corner gusset 118 as described above (e.g., including two mounting holes 950A in the upper portion of the side panel 953), the rear panel 951 is provided with an alternate orientation and connection with respect to the above-described embodiments. As shown in FIGS. 31 and 32, the rear panel 951 does not extend along the rear surface 128A of the rear bolster 128. Rather, the upper end of the rear panel 951 is bent 90 degrees from the main central portion of the panel 951 that extends between the rear bolster 128 and the bumper 124. In other words, the upper end of the rear panel 951 forms a horizontally-extending mounting tab or mounting flange 961. The mounting flange 961 extends along a bottom surface 128C of the rear bolster 128, which surface can be formed by a return flange that extends forwardly from the rear surface 128A. The mounting flange 961 can provide an upper surface that abuts the bottom surface 128C of the rear bolster 128. The mounting flange 961 and the bottom surface 128C can be provided with one or more corresponding mounting hole 961A to receive one or more non-permanent, removable fasteners (e.g., bolts), although permanent connection (e.g., by welding) may be alternately provided. The rear panel 951 having the 90-degree offset mounting flange 961 can make the rear impact guard 920 more easily retro-fitted to a pre-existing trailer frame.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, one having ordinary skill in the art will appreciate that specific features of the numerous embodiments disclosed may be mixed and matched in other ways where not specifically inhibited, even though specific illustration of such embodiments may not be exhaustively covered herein.

What is claimed is:

1. A trailer comprising:
   a front end provided for attachment to a truck;
   a rear end spaced from the front end in a longitudinal direction to define a cargo area between the front and rear ends;
   a frame including a rear bolster extending transversely to the longitudinal direction at a bottom rear edge of the cargo area; and
   a rear impact guard including
      a bumper positioned at the rear end of the trailer and spaced below the rear bolster, the bumper having opposing distal ends spaced laterally across the trailer,
      a pair of distal end supports connected to the corresponding distal ends of the bumper, each of the pair of distal end supports including
         a diagonal truss member coupled to the distal end of the bumper and extending therefrom along an axis in a forward, inward and upward direction from the bumper to an attachment point beneath the cargo area, and
         a vertical stabilizer member separate from the diagonal truss member and coupled to the distal end of the bumper and extending upwardly to the rear bolster, the vertical stabilizer reducing an offset component of buckling load incident on the diagonal truss member upon rear impact to the bumper, and
      at least one inboard post extending between the bumper and the rear bolster at a location between the pair of distal end supports.

2. The trailer of claim 1, wherein each of the diagonal truss members is a tubular member having an outside diameter not greater than 3.5 inches.

3. The trailer of claim 1, wherein each of the vertical stabilizer members is a tubular member with flat ends.

4. The trailer of claim 1, wherein each of the vertical stabilizer members is free of any permanent connections to the rear bolster and is free of any permanent connections to the bumper.

5. The trailer of claim 1, wherein one of the diagonal truss members and a corresponding one of the vertical stabilizer members are both secured to the bumper with a shared mounting bracket shaped to conform to multiple surfaces of the bumper.

6. The trailer of claim 1, wherein each of the diagonal truss members and each of the vertical stabilizer members are independently secured to the bumper.

7. The trailer of claim 1, wherein an upper portion of each of the vertical stabilizer members is coupled to the rear bolster at a joint between the rear bolster and a corresponding rear frame post that extends vertically up from a distal end of the rear bolster.

8. The trailer of claim 1, further comprising a pair of back-up plates, each of which lies directly against an upper portion of a corresponding one of the vertical stabilizer members and has a mounting hole aligned with a mounting hole of the vertical stabilizer member.

9. The trailer of claim 1, wherein the vertical stabilizer member of each distal end support is a post constructed of multiple panels including at least a rear panel extending parallel to a rear surface of the rear bolster, and a side panel extending along a lateral side edge of the trailer, forwardly from the rear panel.

10. The trailer of claim 9, wherein the side panels are secured to respective corner gussets of the frame that are positioned directly forwardly of respective rear frame posts of the frame that extend vertically up from opposite distal ends of the rear bolster.

11. The trailer of claim 9, wherein the rear and side panels of each post jointly define a notch that receives a bottom end of a corresponding rear frame post at the rear end of the trailer.

12. The trailer of claim 9, wherein each post further includes an additional panel extending from a forward edge of the corresponding side panel and spaced forwardly of the rear panel.

13. The trailer of claim 9, wherein an upper portion of each of the rear panels includes a forwardly-bent mounting tab including a mounting hole, the mounting tab extending along a bottom surface of the rear bolster for connection thereto.

14. The trailer of claim 9, wherein each post further includes a shear web extending between respective interior surfaces of the rear and side panels.

15. A trailer comprising:
   a front end provided for attachment to a truck;
   a rear end spaced from the front end in a longitudinal direction to define a cargo area between the front and rear ends;
   a frame including a rear bolster extending transversely to the longitudinal direction at a bottom rear edge of the cargo area; and
   a rear impact guard including
      a bumper positioned at the rear end of the trailer and spaced below the rear bolster, the bumper having opposing distal ends spaced laterally across the trailer,
      a pair of distal end supports connected to each corresponding distal end of the bumper, each of the pair of distal end supports including a diagonal truss member coupled to the distal end of the bumper and extending therefrom along an axis in a forward, inward and upward direction from the bumper to an attachment point beneath the cargo area, wherein each of the diagonal truss members has a rear end defining a notch that conforms to and receives both a top side of the bumper and a forward side of the bumper, and at least one inboard post extending between the bumper and the rear bolster at a location between the pair of distal end supports.

16. The trailer of claim 15, wherein each of the diagonal truss members is a tubular member having an outside diameter not greater than 3.5 inches.

17. The trailer of claim 15, wherein each of the pair of distal end supports further includes a vertical stabilizer member separate from the diagonal truss member and coupled to the distal end of the bumper and extending upwardly to the rear bolster, the vertical stabilizer member reducing an offset component of buckling load incident on the diagonal truss member upon rear impact to the bumper.

18. The trailer of claim 17, wherein each of the diagonal truss members and each of the vertical stabilizer members are independently secured to the bumper.

19. The trailer of claim 17, wherein each of the vertical stabilizer members is free of any permanent connections to the rear bolster and is free of any permanent connections to the bumper.

20. The trailer of claim 17, wherein a corresponding pair of one diagonal truss member and one vertical stabilizer member are secured to the bumper with a shared mounting bracket.

21. The trailer of claim 17, wherein the vertical stabilizer member of each distal end support is a post constructed of multiple panels including at least a rear panel extending parallel to a rear surface of the rear bolster, and a side panel extending along a lateral side edge of the trailer, forwardly from the rear panel.

22. The trailer of claim 21, wherein the side panels are secured to respective corner gussets of the frame that are positioned directly forwardly of respective rear frame posts that extend vertically up from opposite distal ends of the rear bolster.

23. The trailer of claim 17, wherein an upper portion of each of the vertical stabilizer members is coupled to the rear bolster at a joint between the rear bolster and a corresponding rear frame post that extends vertically up from a distal end of the rear bolster.

24. The trailer of claim 17, further comprising a pair of back-up plates, each of which lies directly against an upper portion of a corresponding one of the vertical stabilizer members and has a mounting hole aligned with a mounting hole of the vertical stabilizer member.

25. The trailer of claim 15, wherein the notch is a 90-degree square notch.

26. The trailer of claim 15, wherein each of the diagonal truss members is free of any permanent connections to the frame and is free of any permanent connections to the bumper.

* * * * *